United States Patent
Uejo et al.

(10) Patent No.: US 11,238,305 B2
(45) Date of Patent: Feb. 1, 2022

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventors: Hiroyoshi Uejo, Kanagawa (JP); Yuki Yamanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/910,086

(22) Filed: Jun. 24, 2020

(65) Prior Publication Data
US 2021/0248411 A1 Aug. 12, 2021

(30) Foreign Application Priority Data
Feb. 12, 2020 (JP) .............................. JP2020-021691

(51) Int. Cl.
*G06K 9/54* (2006.01)
*G06K 9/03* (2006.01)
*G06K 9/20* (2006.01)

(52) U.S. Cl.
CPC ................. *G06K 9/54* (2013.01); *G06K 9/03* (2013.01); *G06K 9/2054* (2013.01); *G06K 2209/01* (2013.01)

(58) Field of Classification Search
None
See application file for complete search history.

(56) References Cited

U.S. PATENT DOCUMENTS 10,776,434 B1 * 9/2020 Blackman ........... G06F 16/3344
2015/0339536 A1 * 11/2015 Lin ........................ G06K 9/228
382/182

FOREIGN PATENT DOCUMENTS

JP 2015146075 8/2015

* cited by examiner

*Primary Examiner* — David Perlman
(74) *Attorney, Agent, or Firm* — JCIPRNET

(57) ABSTRACT

An information processing apparatus includes a processor configured to execute first preprocessing on acquired image data, and execute second preprocessing on a specified partial region of the image data as a target in a case where information for specifying at least one partial region in an image corresponding to the image data is received from post processing on which the image data after the first preprocessing is processed.

19 Claims, 25 Drawing Sheets

FIG. 5

QUOTATION DOCUMENT

TO ABC INDUSTRY

XYZ TRADING

TABLE A

| ORDER PLACER | QUOTATION DATE | PRODUCT NAME | AMOUNT OF MONEY |
|---|---|---|---|
| FUJI TARO | 02242015 | SCANNER | 10,000 |
| FUJI HANAKO | 03062015 | MOUSE | 6,000 |

TABLE B

| DATE | RESPONSIBLE PERSON | PURCHASED PRODUCT | AMOUNT OF MONEY |
|---|---|---|---|
| 3/1 | FUJI TARO | PC MAIN BODY | 50,000 YEN |
| | | MONITOR | 20,000 YEN |
| 3/3 | FUJI HANAKO | SMARTPHONE | 40,000 YEN |

TOTAL AMOUNT OF MONEY 16,000 YEN

| COMBINATION (FOR EACH REGION) | CERTAINTY DEGREE OF FIRST ROW | CERTAINTY DEGREE OF SECOND ROW | CERTAINTY DEGREE OF THIRD ROW |
|---|---|---|---|
| COMBINATION 1 | HIGH | HIGH | HIGH |
| COMBINATION 2 | HIGH | HIGH | LOW |
| COMBINATION 3 | HIGH | LOW | HIGH |
| COMBINATION 4 | HIGH | LOW | LOW |
| COMBINATION 5 | LOW | HIGH | HIGH |
| COMBINATION 6 | LOW | HIGH | LOW |
| COMBINATION 7 | LOW | LOW | HIGH |
| COMBINATION 8 | LOW | LOW | LOW |

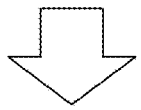

(B)

| COMBINATION (FOR EACH REGION) | ESTIMATED CAUSE |
|---|---|
| COMBINATION 1 | – |
| COMBINATION 2 | CELLS OF VALUES HAVE COLORED BACKGROUNDS |
| COMBINATION 3 | SAME AS ABOVE |
| COMBINATION 4 | ONLY CELLS OF VALUES ARE SHADED |
| COMBINATION 5 | CELLS OF ITEM NAMES HAVE WHITE TEXTS |
| COMBINATION 6 | CELLS OF ITEM NAMES HAVE WHITE TEXTS AND CELLS OF VALUES HAVE COLORED BACKGROUNDS |
| COMBINATION 7 | SAME AS ABOVE |
| COMBINATION 8 | ENTIRE SURFACE HAS GROUND TINT OR ENTIRE SURFACE HAS COLORED BACKGROUND, EACH TEXT IS COLORED TEXT, AND LIKE |

FIG. 19

| CAUSE (FOR EACH REGION) | ESTIMATED CAUSE |
|---|---|
| CAUSE 1 | CELLS OF VALUES HAVE COLORED BACKGROUNDS |
| CAUSE 2 | ONLY CELLS OF VALUES ARE SHADED |
| CAUSE 3 | CELLS OF ITEM NAMES HAVE WHITE TEXTS |
| CAUSE 4 | CELLS OF ITEM NAMES HAVE WHITE TEXTS AND CELLS OF VALUES HAVE COLORED BACKGROUNDS |
| CAUSE 5 | ENTIRE SURFACE HAS GROUND TINT OR ENTIRE SURFACE HAS COLORED BACKGROUND, EACH TEXT IS COLORED TEXT, AND LIKE |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-021691 filed Feb. 12, 2020.

BACKGROUND

(i) Technical Field

The present invention relates to an information processing apparatus and a non-transitory computer readable medium storing a program.

(ii) Related Art

A technology for converting an image of a text printed on printed matter or a handwritten text into a text code usable by a computer is known. This technology is referred to as optical character recognition (OCR) processing. Acquisition of an image corresponding to a document including a text uses a so-called scanner or a digital camera.

While image data imaged by the scanner or the digital camera may be directly output to the OCR processing, processing may be applied in advance in order to increase a value (hereinafter, referred to as a "certainty degree") indicating the certainty of a result of recognition of the text by the OCR processing. For example, cleansing processing of removing a noise, a ground tint, or the like included in the image may be executed before the OCR processing. Besides, the resolution of the image at the time of acquisition may be set to be high. Hereinafter, the processing executed before the OCR processing will be referred to as preprocessing.

SUMMARY

Currently, the certainty degree of the OCR processing is calculated in units of entire images or entire data files which are processing targets. Thus, even in a case where a region in which the certainty degree of the OCR processing is decreased is included, inclusion of the region having a low certainty degree is not noticed in the preprocessing in a case where the certainty degree as a whole is high.

Aspects of non-limiting embodiments of the present disclosure relate to an information processing apparatus and a non-transitory computer readable medium storing a program that improve accuracy of a result obtained by processing on a rear stage side in units of partial regions compared to a case where processing on a front stage side is not notified of information related to partial regions obtained by the processing on the rear stage side.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to execute first preprocessing on acquired image data, and execute second preprocessing on a specified partial region of the image data as a target in a case where information for specifying at least one partial region in an image corresponding to the image data is received from post processing on which the image data after the first preprocessing is processed.

BRIEF DESCRIPTION OF THE DRAWINGS

Exemplary embodiment (s) of the present invention will be described in detail based on the following figures, wherein:

FIG. 5 is a diagram for describing one example of an original document to be set as a reading target;

FIG. 15 is a diagram for describing examples of causes estimated in a case where target data is a table region: (A) illustrates a combination of certainty degrees fed back for one table region, and (B) illustrates the estimated causes;

FIG. 19 is a diagram for describing one example of notified causes;

DETAILED DESCRIPTION

Hereinafter, exemplary embodiments of the present invention will be described.

Exemplary Embodiment

System Configuration

Figure 1:
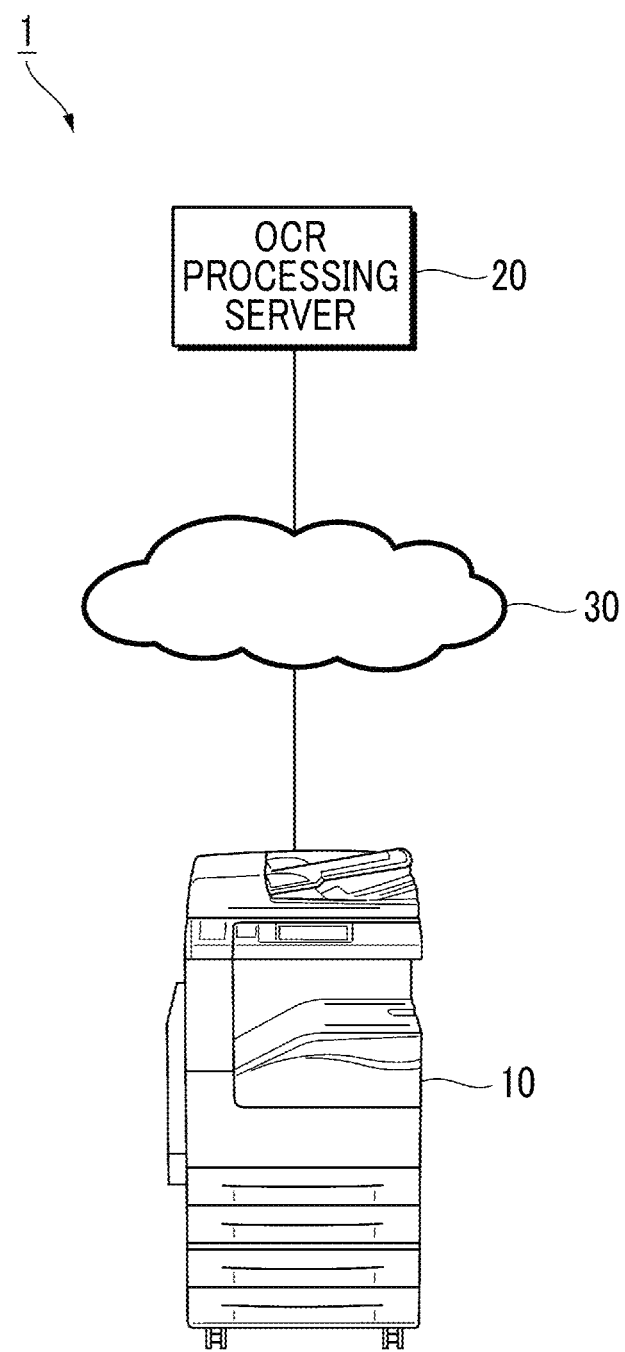
FIG. 1 is a diagram illustrating a configuration example of an information processing system used in an exemplary embodiment.

FIG. 1 is a diagram illustrating a configuration example of an information processing system 1 used in an exemplary embodiment.

An information processing system 1 illustrated in FIG. 1 includes an image processing apparatus 10, an OCR processing server 20 recognizing a text included in image data provided from the image processing apparatus 10, and a cloud network 30 as a network environment.

The image processing apparatus 10 in this exemplary embodiment has a function of generating a duplicate of an original document, a function of printing a document or an image on paper, a function of generating image data by optically reading the original document, a function of transmitting and receiving a facsimile, and the like.

A mechanism that transports the original document one sheet at a time to a position at which information is optically read is provided in an upper portion of a main body of the image processing apparatus 10 illustrated in FIG. 1. For example, this type of mechanism is referred to as an auto document feeder (ADF). The ADF is used for reading the original document to be duplicated or the original document to be transmitted by facsimile.

The function of printing the document or the image on paper is also used in generation of the duplicate. Data of the document or the image is optically read in the image processing apparatus 10 or is also provided from a recording medium connected to the main body or an external information terminal.

Functions provided in the image processing apparatus 10 are not limited to the above functions. In the case of this exemplary embodiment, the image processing apparatus 10 may have any other functions as long as the function of generating the image data by optically reading information about the original document is provided.

The original document in this exemplary embodiment may be paper on which a text or an image is printed or may also be a document or an image in which a text is written by handwriting. The text may be written by handwriting in a part of the document or the image. That is, not all texts in the document need to be handwritten.

In this exemplary embodiment, a handwritten form such as an application document, an invoice document, a delivery document, or a voucher is considered as a handwritten document. In the handwritten form, the text is written in a box that is printed in advance. The handwritten document is not limited to types of forms and may be a contact memo, a circulation document, a postcard, a sealed letter, or the like.

A function of removing a noise, a ground tint, or the like from the image read from the original document is also prepared in the image processing apparatus 10 in this exemplary embodiment. In the case of this exemplary embodiment, the image data after the noise or the like is removed is transmitted to the OCR processing server 20.

While only one image processing apparatus 10 is illustrated in FIG. 1, a plurality of image processing apparatuses 10 constituting the information processing system 1 may be present. The image processing apparatus 10 in this exemplary embodiment is one example of an information processing apparatus.

The OCR processing server 20 in this exemplary embodiment is designed to perform OCR processing on the image data provided from the image processing apparatus 10 and pass text data that is a result of processing to the image processing apparatus 10. The image processing apparatus 10 to which the text data is passed executes postprocessing on the received text data. For example, the postprocessing includes language processing, processing of linking the text data to a correct position in terms of management, searching of a document related to the text data, and searching of a path to be used for delivering a product. A content of the postprocessing is designed in accordance with a content of the original document to be read or a content of required processing.

Besides, a function of feeding back information related to the certainty degree of the result of the OCR processing to the preprocessing for each partial region is also provided in the OCR processing server 20 in this exemplary embodiment. This function is provided in order to increase the certainty of the result of recognition of the text obtained by the OCR processing or increase the quality or accuracy of the result of the postprocessing.

An operator of the image processing apparatus 10 and an operator of the OCR processing server 20 in this exemplary embodiment may be the same or different.

While the OCR processing server 20 specialized in the OCR processing is used in this exemplary embodiment, a general-purpose server supporting a plurality of functions may be used. A computer executing the OCR processing is not limited to a server. For example, the computer executing the OCR processing may be a desktop computer or a laptop computer or may be a smartphone or a tablet terminal.

While one OCR processing server 20 is present in the case of FIG. 1, a plurality of OCR processing servers 20 constituting the information processing system 1 may be present. The plurality of OCR processing servers 20 may process one image data in a distributed manner. The OCR processing server 20 in this exemplary embodiment is one example of an apparatus executing processing on a rear stage side.

While the cloud network 30 is used in communication between the image processing apparatus 10 and the OCR processing server 20 in the case of this exemplary embodiment, the invention is not limited to communication through the cloud network 30. For example, a local area network (LAN) or a mobile communication system abbreviated to 4G or 5G may be used in communication between the image processing apparatus 10 and the OCR processing server 20.

Configuration of Image Processing Apparatus

Figure 2:
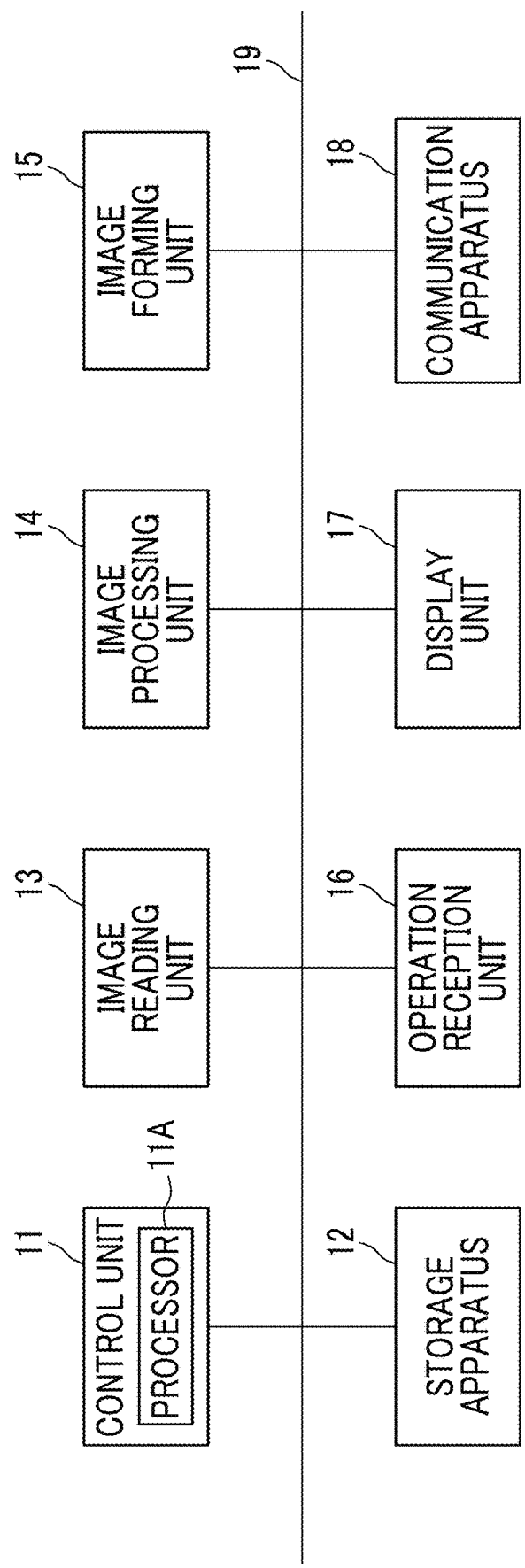
FIG. 2 is a diagram for describing one example of a hardware configuration of an image processing apparatus used in Exemplary Embodiment 1.

FIG. 2 is a diagram for describing one example of a hardware configuration of the image processing apparatus 10 used in Exemplary Embodiment 1. The image processing apparatus 10 illustrated in FIG. 2 includes a control unit 11 controlling the entire apparatus, a storage apparatus 12 storing the image data and the like, an image reading unit 13 generating the image data by optically reading the original document, an image processing unit 14 applying processing of converting gradation, processing of correcting color, and the like to the image data, an image forming unit 15 forming an image corresponding to the image data on paper, an operation reception unit 16 receiving an operation of a user, a display unit 17 displaying a user interface screen and the like, and a communication apparatus 18 used for external communication. The control unit 11 and each unit are connected through a bus 19 and a signal line, not illustrated.

The control unit 11 in this exemplary embodiment includes a processor 11A, a read only memory (ROM), not illustrated, storing firmware, a basic input output system (BIOS), and the like, and a random access memory (RAM), not illustrated, used as a work area. The control unit 11 functions as a so-called computer. The preprocessing and the postprocessing are implemented through execution of a program by the processor 11A.

The storage apparatus 12 is configured with a hard disk apparatus, a non-volatile rewritable semiconductor memory, or the like. For example, the storage apparatus 12 stores the image data read by the image reading unit 13. The storage apparatus 12 may store application programs.

The image reading unit 13 includes, for example, a contact image sensor (CIS). The CIS includes a light emitting diode (LED) emitting illumination light, a photosensor receiving light reflected by the original document, and an optical system condensing the light reflected by the original document to the photosensor.

In the case of a mode of reading the image while transporting the original document to a reading position by the ADF, the CIS is used in a state where the CIS is fixed at the reading position. In the case of a mode of reading the image in a state where the original document is arranged on a glass surface through which light is transmitted, the CIS is controlled to be relatively moved with respect to the original document.

The image processing unit 14 is configured with a graphics processing unit (GPU), a field programmable gate array (FPGA), or the like executing the processing of converting gradation, the processing of correcting color, and the like.

The image forming unit 15 includes a mechanism corresponding to an electrophotographic method of forming the image corresponding to the image data on a paper surface by fixing toner transferred to paper by heat or an ink jet method of forming the image corresponding to the image data on a paper surface by ejecting liquid droplets to paper.

The operation reception unit 16 is configured with a touch sensor, a physical switch or button, or the like arranged on a display surface of the display unit 17.

The display unit 17 is configured with, for example, a liquid crystal display or an organic EL display. A device in which the operation reception unit 16 and the display unit 17 are integrated is referred to as a touch panel. The touch panel is used for receiving an operation of the user with respect to a key (hereinafter, referred to as the "soft key") displayed in a software manner.

The communication apparatus 18 is configured with a module complying with a wired or wireless communication standard. For example, an Ethernet (registered trademark) module, a universal serial bus (USB), a wireless LAN, or a facsimile modem is used in the communication apparatus 18.

Content of Processing

Hereinafter, processing executed by cooperation between the image processing apparatus 10 and the OCR processing server 20 will be described.

Summary of Processing

Figure 3:
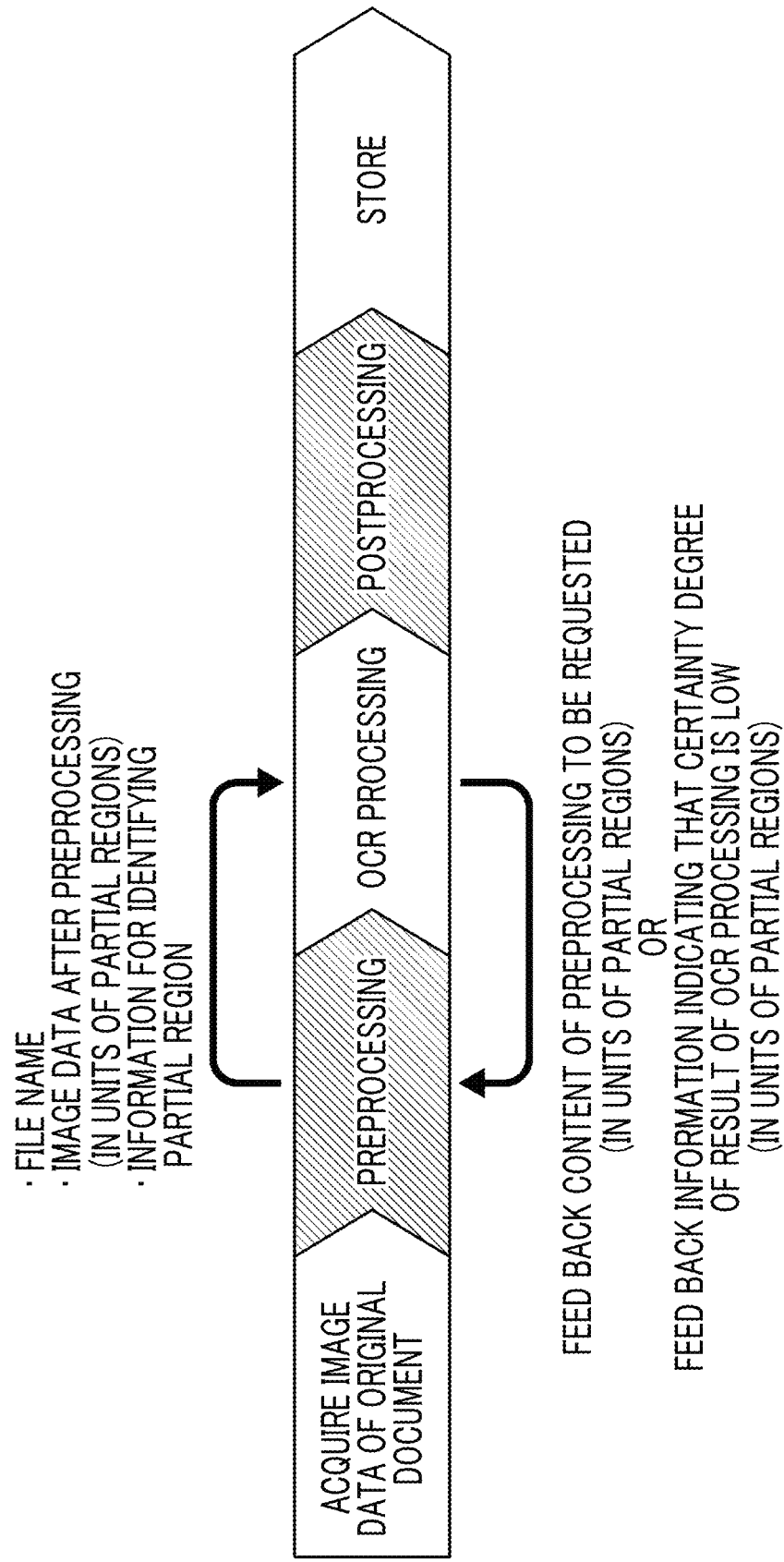
FIG. 3 is a diagram for describing a summary of processing executed in Exemplary Embodiment 1.

FIG. 3 is a diagram for describing a summary of processing executed in Exemplary Embodiment 1. The processing in this exemplary embodiment is configured with five types of processing. The five types of processing includes processing of acquiring the image data of the original document, the preprocessing with respect to the acquired image data, the OCR processing with respect to the image data after the preprocessing, the postprocessing of processing the text data which is the result of the OCR processing, and processing of storing the result of the postprocessing in the storage apparatus 12 (refer to FIG. 2).

In the case of this exemplary embodiment, the OCR processing server 20 (refer to FIG. 1) executes the OCR processing, and the image processing apparatus 10 (refer to FIG. 1) executes the other four types of processing.

In the case of this exemplary embodiment, cleansing processing of removing a noise, a ground tint, or the like and processing of separating into objects are executed as the preprocessing. Processing of extracting a value corresponding to a key or the key corresponding to the value by referring to a dictionary in which combinations of the key and the value are registered is executed as the postprocessing. A text or an image corresponds to the key and the value in this exemplary embodiment. For example, in a case where the key is a name, Fuji Taro corresponds to the value. In other words, the key is a text or a figure indicating an item, and the value is a text or a figure indicating a specific content corresponding to the item.

In the case of this exemplary embodiment, information for specifying a processing target between the preprocessing and the OCR processing is notified to the OCR processing from the preprocessing. In the case of FIG. 3, a file name as the information for specifying the processing target is notified as data attached to the image data after the preprocessing. In the case of this exemplary embodiment, the file name is configured with a date and time of reading or a user name performing a reading work, information for distinguishing the image processing apparatus 10 used in reading, and the like. Information for specifying the file name is not limited to this exemplary embodiment.

The OCR processing clearly indicates the processing target using, for example, the file name in feeding back of information to the preprocessing. Notification of the file name enables cooperation between the preprocessing and the OCR processing. For example, in a case where the preprocessing and the OCR processing process a plurality of pieces of image data in parallel, the processing target may be distinguished using the file name. As long as the processing target may be specified, information notified to the OCR processing from the preprocessing is not limited to the file name.

In the case of this exemplary embodiment, processing of separating the image data into a plurality of objects is also executed in the preprocessing.

In the case of this exemplary embodiment, four objects including a region of a text (hereinafter, referred to as the "text region"), a region of a table (hereinafter, referred to as the "table region"), a region of graphics (hereinafter, referred to as the "graphics region"), and a region of a drawing (hereinafter, referred to as the "drawing region") are used.

For example, a region in which a title of the original document, a text, or a numerical value is included is cut out as the text region. A table or a caption attached to the table is cut out as the table region. A region in which a company name or the like is graphically illustrated is cut out as the graphics region or the drawing region. The other region is a background. Each individual object is one example of the partial region.

The background, the graphics region, and the drawing region are excluded from the target of the OCR processing. Thus, image data corresponding to the text region and the table region is transmitted to the OCR processing server 20 from the image processing apparatus 10 as target data. Information for identifying each individual partial region is assigned to each target data.

In the case of this exemplary embodiment, the image data after the preprocessing is transmitted to the OCR processing from the preprocessing in units of partial regions.

Besides, information for specifying the content of the executed preprocessing may be notified to the OCR processing from the preprocessing. The content of the preprocessing may be used in the case of estimating a cause of a low certainty degree on the side of the OCR processing.

In the case of this exemplary embodiment, the content of the preprocessing to be requested in units of partial regions is fed back to the preprocessing from the OCR processing, or information indicating that the certainty degree of the result of the OCR processing is low is fed back to the preprocessing from the OCR processing. The certainty degree is one example of information related to accuracy.

In the case of this exemplary embodiment, the partial region is used in the meaning of each individual region cut out as an object. In other words, in a case where a plurality of text regions are present, there is a possibility that different information is fed back for each text region. The same applies to the table region. For the table region, there is a possibility that different information is fed back in units of rows or columns.

In the case of this exemplary embodiment, information for identifying each individual partial region is notified to the OCR processing from the preprocessing. Accordingly, feedback to the preprocessing from the OCR processing includes information for identifying each individual partial region. In the OCR processing, the certainty degree may be calculated by regarding a plurality of partial regions having the same type of object as one partial region, and information indicating that the certainty degree is low may be fed back together with information for identifying the plurality of partial regions of which the certainty degree is calculated.

In the case of this exemplary embodiment, feedback for the partial region having a certainty degree higher than a predetermined threshold value is not executed. Accordingly, in a case where each individual certainty degree of all partial regions exceeds the predetermined threshold value, feedback to the preprocessing from the OCR processing is not executed. The reason is that the text data having a high certainty degree is obtained.

In this exemplary embodiment, the certainty degree of the partial region is obtained as an average value of the certainty degrees calculated for each individual text extracted from the corresponding partial region. The text here includes numbers and symbols. The average value may be calculated using different weighting for each partial region. For example, different weights may be used between the case of the text region and the case of the table region. In addition, even in the partial regions of the same type, different weights may be used between a title part and a body text.

The threshold value used for evaluating the certainty degree of the partial region may be different or the same for each type of object to which the partial region corresponds.

For example, the certainty degree may be calculated using different weights between the text region and the table region.

Feedback to the preprocessing from the OCR processing may be feedback without designating the partial region. Even in this case, the OCR processing recognizes which partial region has a high certainty degree and which partial region has a low certainty degree.

Accordingly, the OCR processing may recognize a change in certainty degree by selecting the partial region having a low certainty degree in the previous OCR processing from the image data to which new preprocessing is applied. The OCR processing may also selectively output only the text data for which the certainty degree higher than the threshold value is obtained to the postprocessing.

Processing Executed by Image Processing Apparatus

Figure 4:
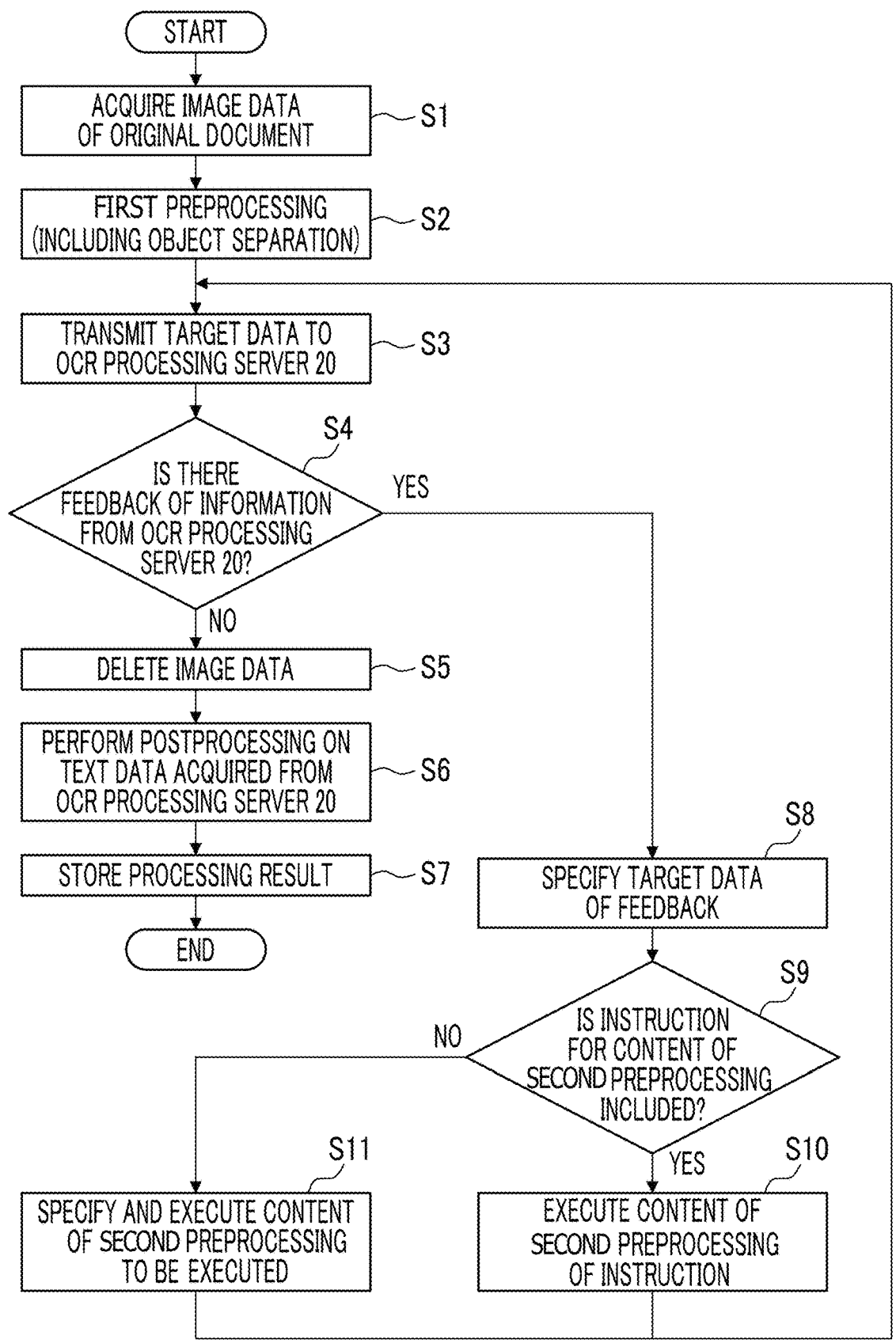
FIG. 4 is a flowchart for describing one example of processing executed by the image processing apparatus in Exemplary Embodiment 1.

FIG. 4 is a flowchart for describing one example of processing executed by the image processing apparatus 10 in Exemplary Embodiment 1. Symbol S illustrated in the drawing denotes a step. The processing illustrated in FIG. 4 is executed by the processor 11A (refer to FIG. 2).

The processing illustrated in FIG. 4 is started by receiving an reading instruction of the original document that accompanies the OCR processing. For example, operation of a start button is used for providing the reading instruction to the image processing apparatus 10.

A condition or an assumption for reading may be set in the reading instruction. For example, the type of original document which is a reading target may be designated. In a case where the type of original document is designated, the content of the preprocessing prepared in accordance with the type of original document is selected by the processor 11A. In a case where a relationship between the type of original document and the content of the preprocessing obtaining a high certainty degree is learned by machine learning, the processor 11A selects the content of the preprocessing corresponding to the designated type of original document.

The reading instruction in which the condition or the assumption for reading is not set may also be provided. In this case, the preprocessing with a content corresponding to the type of original document or characteristics of the original document estimated by reading is selected by the processor 11A. In a case where the title of the original document may be read by the image processing apparatus 10, the preprocessing with a content corresponding to the read title is selected by the processor 11A.

In a case where the reading instruction of the original document accompanying the OCR processing is received, the processor 11A acquires the image data of the original document (step S1). For example, the image data is output in portable document format (PDF) or another predetermined format.

FIG. 5 is a diagram for describing one example of the original document which is the reading target. The title of the original document illustrated in FIG. 5 is quotation document, and a ground tint is provided on the entire paper. The quotation document illustrated in FIG. 5 includes two tables. An upper part is Table A, and a lower part is Table B. Both of Table A and Table B illustrated in FIG. 5 are configured with three rows. All item names in which field headings of Table A and Table B are written are printed with white texts in a black background. In the second row and the third row of Table A, black texts are printed in a white background. In the second row and the third row of Table B, texts are printed in a colored background. The texts may be any of black texts, white texts, and colored texts. A case where the background is shaded is also considered.

FIG. 4 will be described again.

Next, the processor 11A executes the preprocessing on the acquired image data (step S2). In the case of this exemplary embodiment, separation of the objects is executed in the preprocessing. Separation of the objects uses a known technology. The cleansing processing that is selected in advance or is set in initial setting is also executed.

Figure 6:
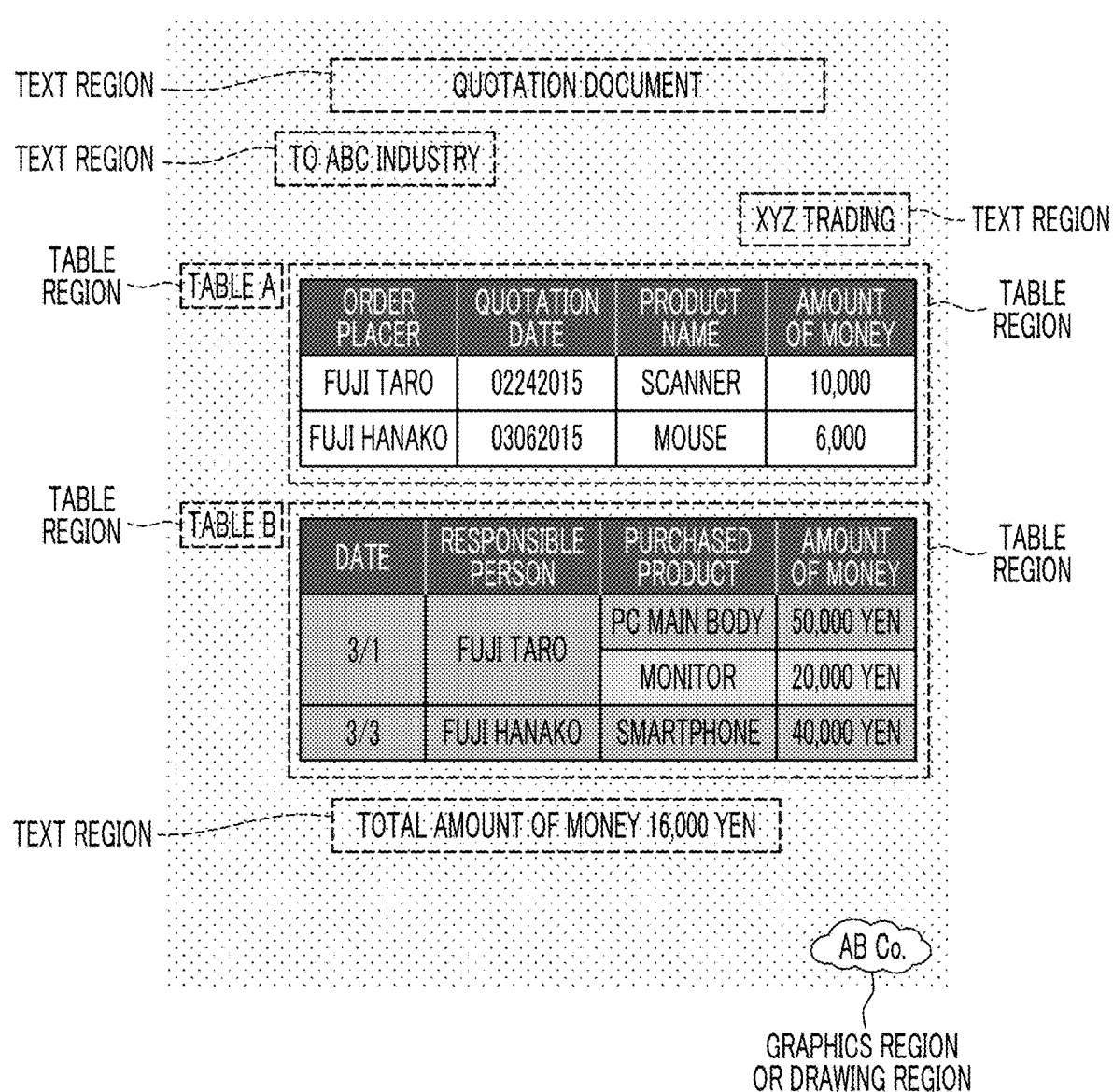
FIG. 6 is a diagram for describing examples of objects separated from image data.

FIG. 6 is a diagram for describing examples of objects separated from the image data. In the case of FIG. 6, regions including character strings of "quotation document", "to ABC industry", "XYZ trading", and "total amount of money 16,000 yen" are separated from the image data as the text region. Regions including a table corresponding to the texts of Table A and a table corresponding to the texts of Table B are separated from the image data as the table region. A logo arranged lower right in the image data is separated from the image data as the graphics region or the drawing region.

The preprocessing may be before or after separation of the objects. In this exemplary embodiment, separation of the objects is executed after execution of the preprocessing.

FIG. 4 will be described again.

Next, the processor 11A transmits the target data to the OCR processing server 20 (step S3). In the case of this exemplary embodiment, the target data is image data corresponding to the text region and the table region. That is, image data in a part determined as the graphics region and the drawing region is not transmitted to the OCR processing server 20.

Then, the processor 11A determines whether or not there is feedback of information from the OCR processing server 20 (step S4).

For example, in a case where there is no feedback of information in a predetermined time period, the processor 11A obtains a negative result in step S4. In the case of this exemplary embodiment, no feedback of information means that the certainty degree of the result of the OCR processing is high for all partial regions. As described above, in this exemplary embodiment, the certainty degree is calculated in units of partial regions. The certainty degree may be calculated in units of entire tables, or the certainty degree may be calculated in units of rows or columns constituting the table.

In a case where a negative result is obtained in step S4, the processor 11A deletes the image data acquired in step S1 from the storage apparatus 12 (refer to FIG. 2) (step S5). The reason is that the preprocessing does not need to be executed again on the image data to be set as a target. Deletion here is deletion of the image data for the preprocessing. Accordingly, the image data may be stored for other purposes.

Next, the processor 11A performs the postprocessing on the text data acquired from the OCR processing server 20 (step S6). Then, the processor 11A stores a processing result in the storage apparatus 12 (step S7). Step S5 may be executed after step S6 or step S7.

In the case of this exemplary embodiment, during execution of step S5 to step S7 or after execution of processing of step S5 to step S7, the processor 11A learns that a high certainty degree is obtained for the entire image data or a specific partial region by the content of the immediately previously executed preprocessing. The unit of learning also applies to a case, described later, where the certainty degree is low.

In a case where a positive result is obtained in step S4, the processor 11A specifies the target data of feedback (step S8). In the case of this exemplary embodiment, feedback is provided to the image processing apparatus 10 from the OCR processing server 20 when a partial region having a certainty degree not exceeding the predetermined threshold value is present. In the case of this exemplary embodiment, information fed back from the OCR processing server 20 includes information for identifying the partial region to be set as a target. For example, coordinates or a serial number indicating a position in the image data in which the original document is imaged is used in the information for identifying the partial region. For example, the coordinates are provided as one or a plurality of coordinate points prescribing outer edges of the region. In a case where the partial region has a rectangular shape, for example, a coordinate point at an upper left corner of the partial region is used. The information for identifying the partial region is included in the target data transmitted to the OCR processing server 20 in step S3. In a case where the target data is specified, the image data to be set as a target and the types of objects are also specified.

Next, the processor 11A determines whether or not the information which is fed back includes an instruction for the content of the preprocessing (step S9). As described using FIG. 3, a function of feeding back information indicating that the certainty degree is lower than the threshold value and the content of processing to be requested in the preprocessing to the preprocessing of the image processing apparatus 10 is provided in the OCR processing server 20 in this exemplary embodiment. For example, the content of processing to be requested includes the type of cleansing processing, the strength of the cleansing processing, and a parameter value to be used in the cleansing processing. For example, types of cleansing processing include processing of removing the ground tint or shading, processing of removing a stain, and processing of converting a white text or a colored text to a black text by removing the color of the background.

Removal of the ground tint, shading, or the like uses, for example, a technique referred to as generative adversarial networks (GAN). A technology for removing the noise or the like using the GAN is already used in practice and thus, will not be described in detail.

In a case where a positive result is obtained in step S9, the processor 11A executes the content of the preprocessing of the instruction (step S10). In the case of this exemplary embodiment, new preprocessing is executed on only the target data specified in step S8. The target of the preprocessing with a new content may be set as the entire image data of the original document.

After execution of step S10, the processor 11A returns to step S3. In the case of this exemplary embodiment, the processor 11A transmits the image data after the preprocessing to the OCR processing server 20 as the target data for only the partial region specified in step S8. At this point, the processor 11A notifies the OCR processing server 20 of information for specifying the partial region on which the preprocessing is executed again.

The target data transmitted to the OCR processing server 20 in step S3 may include another target data other than the target data specified in step S8. Even in a case where another target data is included, the OCR processing server 20 may selectively extract the target data corresponding to the partial region having a low certainty degree.

In a case where a negative result is obtained in step S9, the processor 11A specifies and executes the content of the preprocessing to be executed (step S11).

Figure 7:
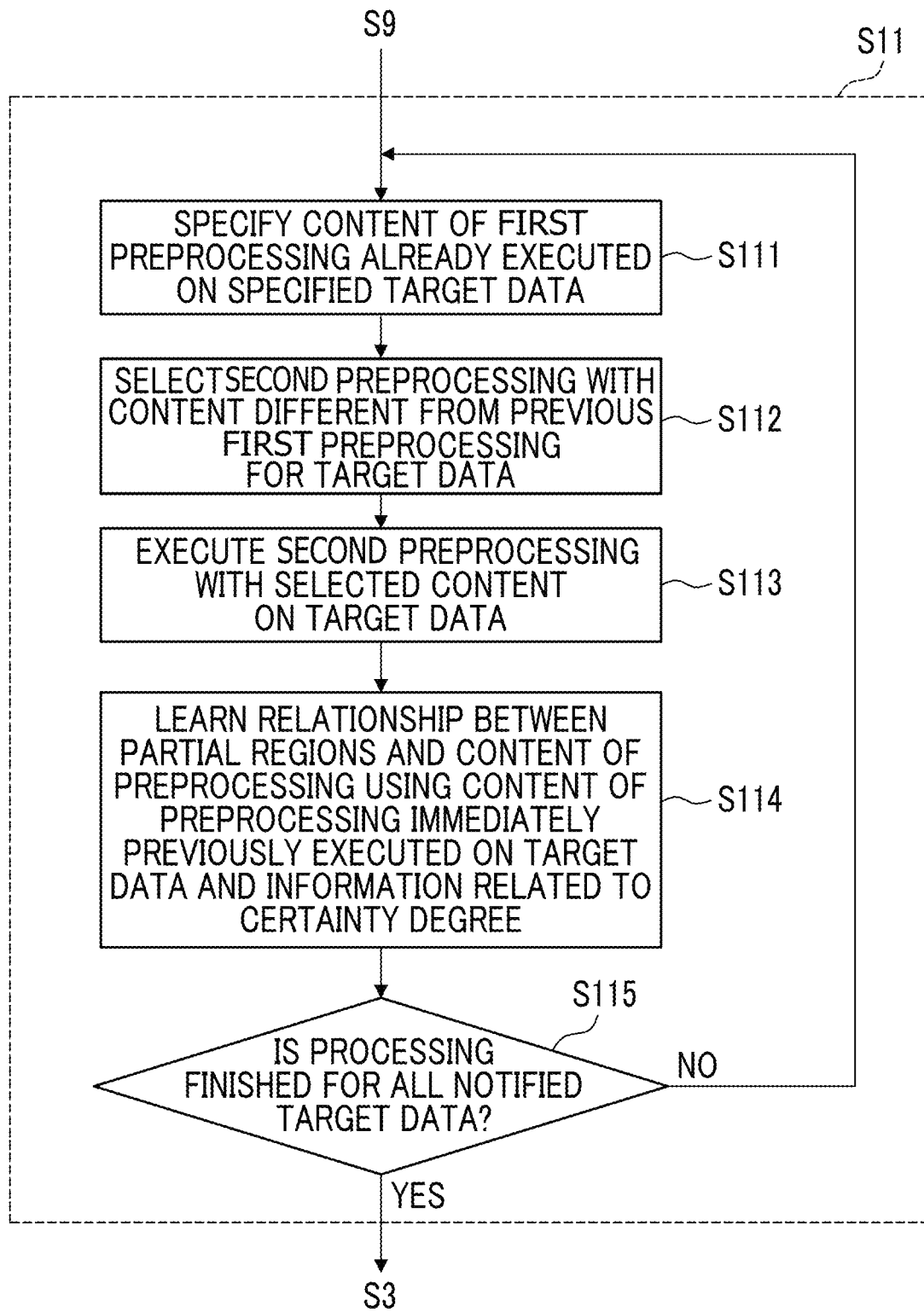
FIG. 7 is a flowchart for describing one example of processing executed in step S11 in Exemplary Embodiment 1.

FIG. 7 is a flowchart for describing one example of processing executed in step S11 in Exemplary Embodiment 1. Symbol S illustrated in the drawing denotes a step.

The processor 11A that starts step S11 specifies the content of the preprocessing that is already executed on the specified target data (step S111). In a case where the preprocessing is already executed a plurality of times on identical target data of an identical original document, the processor 11A specifies the content of the preprocessing performed a plurality of times.

Next, the processor 11A selects the preprocessing with a content different from previous preprocessing for the target data (step S112). The reason is that only information indicating that the certainty degree is lower than the threshold value is fed back from the OCR processing server 20 in the case of this exemplary embodiment.

Next, the processor 11A executes the preprocessing with the selected content on the target data (step S113). Executing the preprocessing with a different content results in a possibility that the certainty degree exceeds the threshold value in the OCR processing server 20. Since the cause of the low certainty degree remains unknown, there is also a possibility that the certainty degree is further decreased.

In step S113, the preprocessing selected in step S112 may also be executed on the entire image data.

Next, the processor 11A learns a relationship between the partial regions and the content of the preprocessing using the content of the preprocessing immediately previously executed on the target data and information related to the certainty degree (step S114). The information related to the certainty degree is information indicating that the certainty degree is low.

In the case of this exemplary embodiment, the content of the preprocessing immediately previously executed on the partial region is machine-learned as training data. The unit of learning is not limited to the partial region and may be a unit of the type of object, a unit of the type of original document, or a unit of similar images. Even in a case where the types of objects are the same, the content of the preprocessing contributing to improvement in certainty degree varies in a case where the combination of the background and the text varies as in Table A and Table B in FIG. 6. Thus, machine learning is performed in units of partial regions in this exemplary embodiment.

In this exemplary embodiment, reinforcement learning is employed in machine learning. In reinforcement learning, learning progresses in order to increase a reward. Thus, no reward or a low reward is assigned to the content of the preprocessing obtaining only a certainty degree lower than the threshold value. A high reward is provided to the content of the preprocessing in a case where a certainty degree higher than the threshold value is obtained like a case where a negative result is obtained in step S4.

The result of machine learning is used in decision of the content of the preprocessing to be subsequently executed. The preprocessing to be subsequently executed includes re-execution of the preprocessing accompanied by feedback and the preprocessing with respect to the image data of a newly read original document.

In a case where the image data corresponding to the partial regions is provided to a learned model subjected to reinforcement learning, the content of the preprocessing used in step S2 is output. Increasing the accuracy of reinforcement learning decreases the number of times of re-execution. The learned model subjected to machine learning may be applied to selection of the content of the preprocessing in step S112. A possibility of increasing the certainty degree above the threshold value may be increased compared to the case of randomly selecting the content of the preprocessing.

After step S114, the processor 11A determines whether or not processing is finished for all notified target data (step S115).

In a case where a negative result is obtained in step S115, the processor 11A returns to step S111 and repeats a series of processing on the target data corresponding to another partial region.

In a case where a positive result is obtained in step S115, the processor 11A returns to step S3.

The above processing is repeated until a negative result is obtained in step S4 executed after execution of step S10 or step S11. Consequently, the text data having a certainty degree higher than the threshold value is provided to the postprocessing executed by the image processing apparatus 10, and improvement in the accuracy or the reliability of the result of the postprocessing is implemented. In addition, reduction of an effort to manually check or manually correct the recognized text data is implemented.

Exemplary Embodiment 2

In the above exemplary embodiment, a case where the content of the preprocessing to be requested is specifically fed back to the image processing apparatus 10 from the OCR processing server 20 is described. In order to specifically specify the content of the preprocessing, functions corresponding to processing of estimating the cause of the low certainty degree in the OCR processing server 20, processing of specifying the content of processing of eliminating the estimated cause, and the like need to be prepared on the OCR processing server 20 side. However, the functions are not necessarily provided in the OCR processing server 20.

Figure 8:
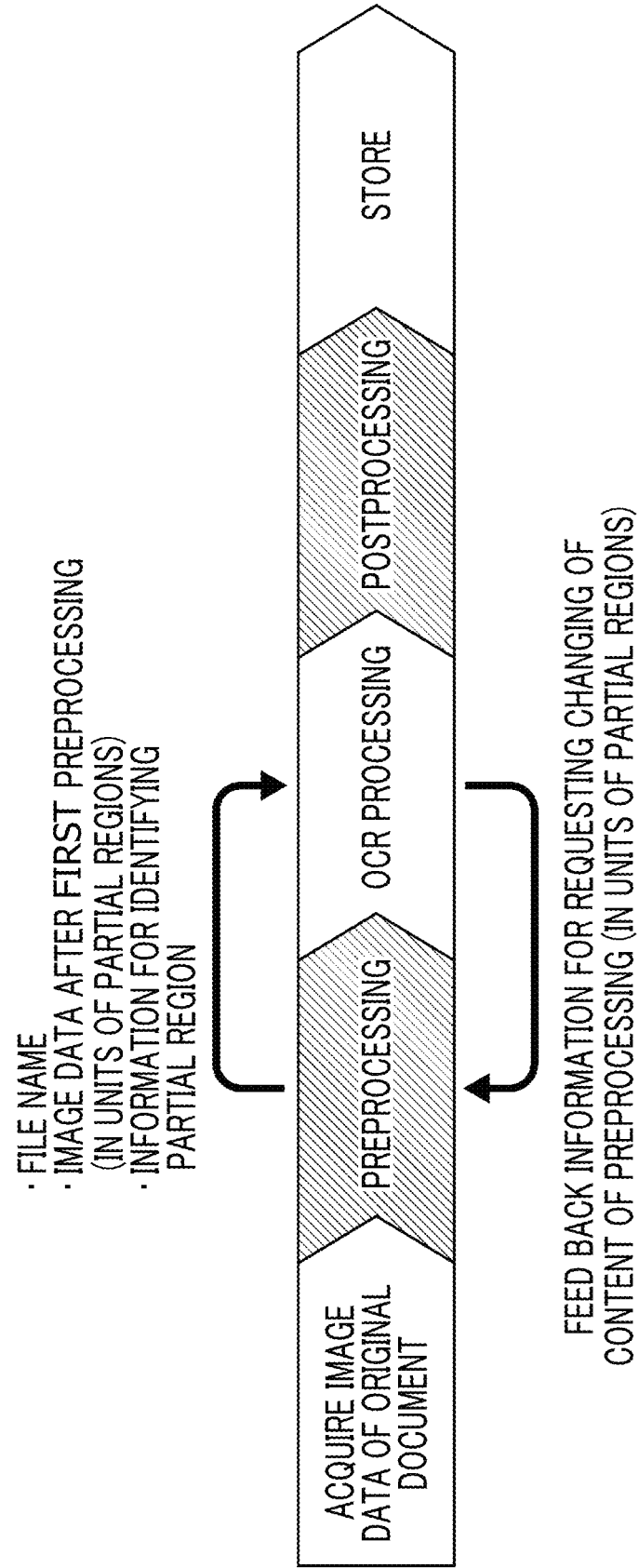
FIG. 8 is a diagram for describing a summary of processing executed in Exemplary Embodiment 2.

FIG. 8 is a diagram for describing a summary of processing executed in Exemplary Embodiment 2. In FIG. 8, parts corresponding to FIG. 3 are designated by corresponding reference signs.

In the case of processing illustrated in FIG. 8, information fed back to the preprocessing from the OCR processing is different from Exemplary Embodiment 1.

In the case of this exemplary embodiment, information for requesting changing of the content of the preprocessing is fed back. That is, a specific content of processing to be requested in the preprocessing is not fed back.

Output of the request for changing the content of the preprocessing may be triggered by the presence of the partial region having a low certainty degree and does not need the above processing such as estimation.

Figure 9:
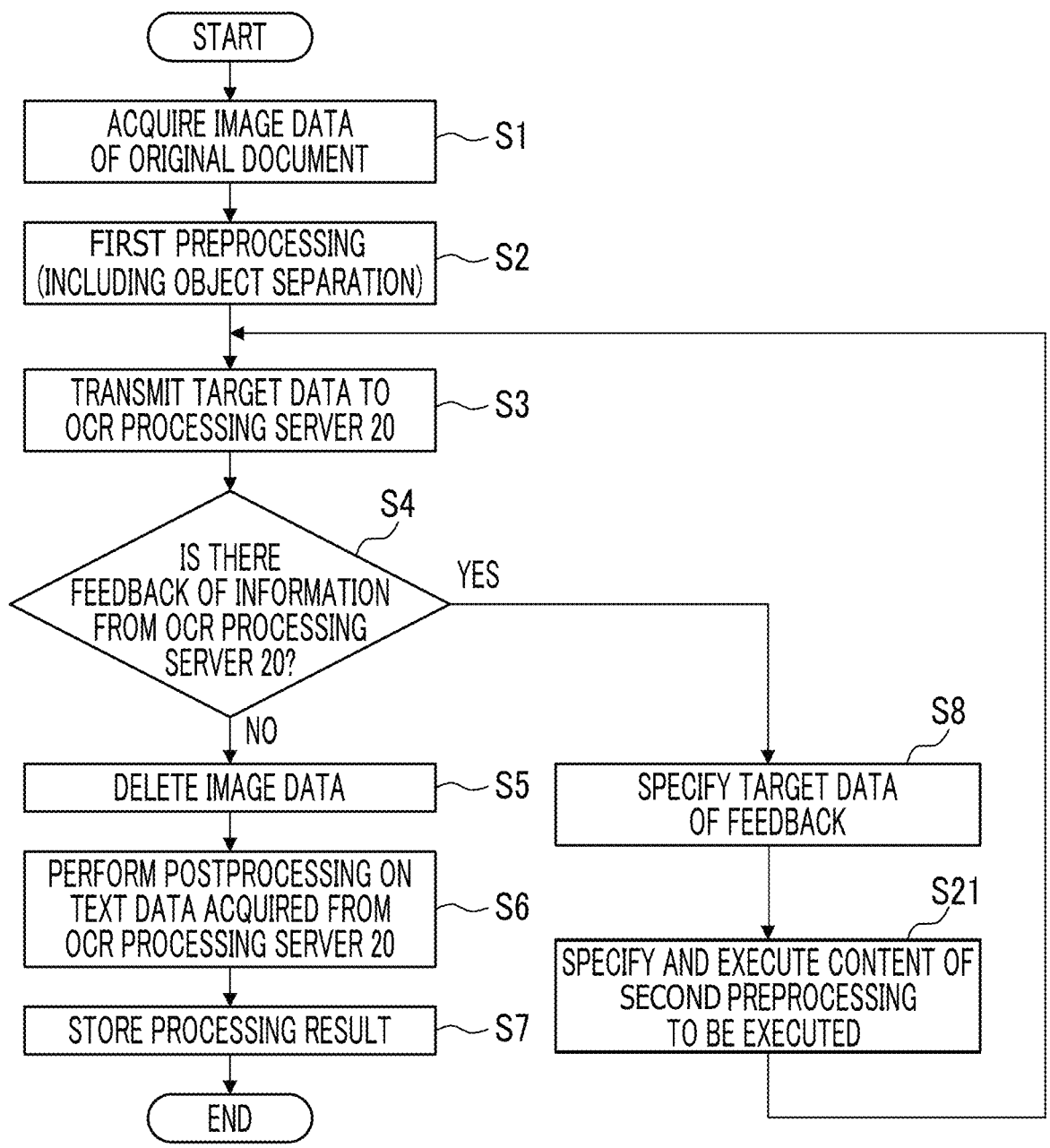
FIG. 9 is a flowchart for describing one example of processing executed by an image processing apparatus in Exemplary Embodiment 2.

FIG. 9 is a flowchart for describing one example of processing executed by the image processing apparatus 10 in Exemplary Embodiment 2. In FIG. 9, parts corresponding to FIG. 4 are designated by corresponding reference signs.

In the case of this exemplary embodiment, only the information for requesting changing of the content of the preprocessing is fed back to the image processing apparatus 10 from the OCR processing server 20.

Thus, after execution of step S8, the processor 11A specifies and executes the content of the preprocessing to be executed on the specified target data (step S21).

Figure 10:
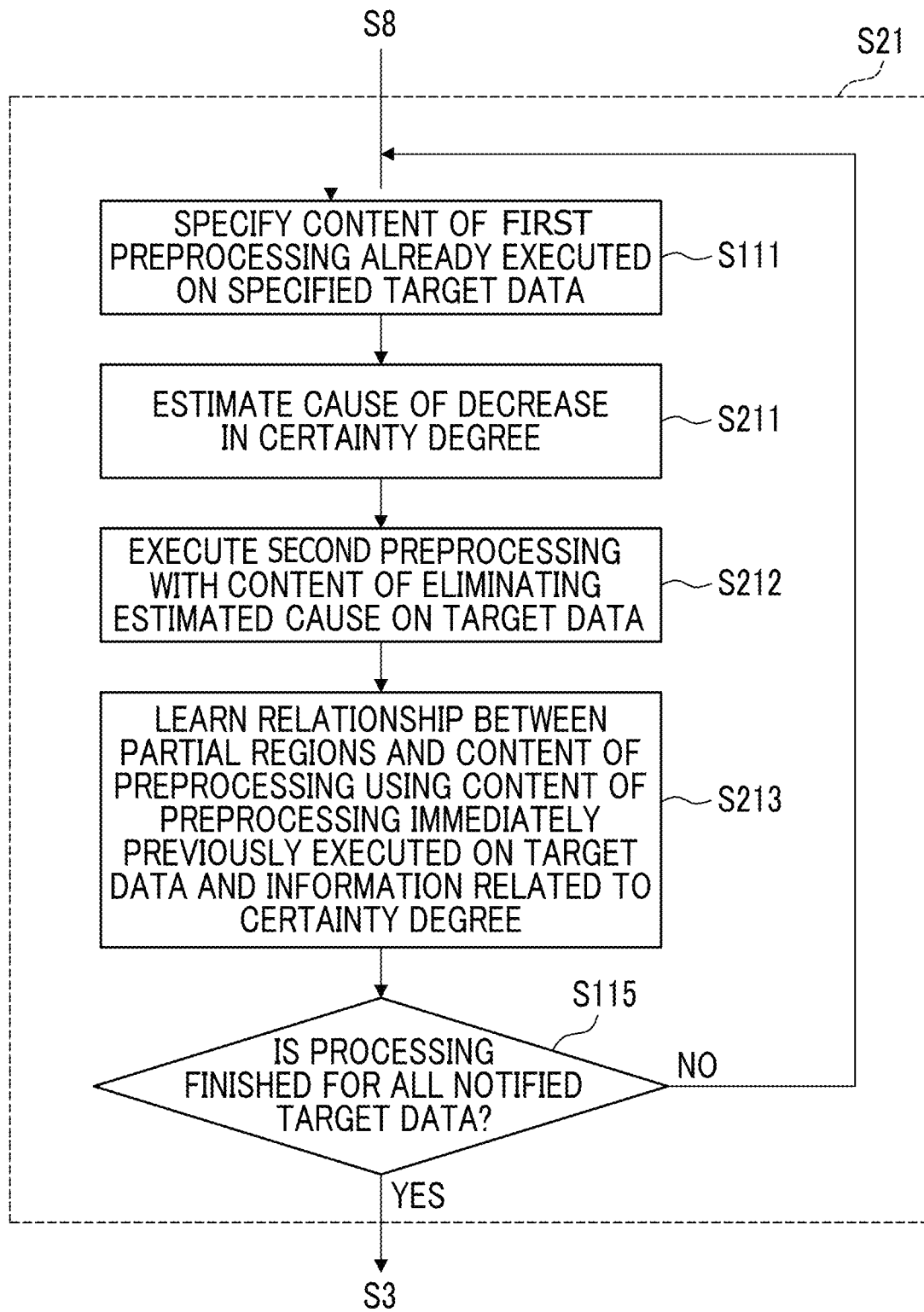
FIG. 10 is a flowchart for describing one example of processing executed in step S21 in Exemplary Embodiment 2.

FIG. 10 is a flowchart for describing one example of processing executed in step S21 in Exemplary Embodiment 2. In FIG. 10, parts corresponding to FIG. 7 are designated by corresponding reference signs. Symbol S illustrated in the drawing denotes a step.

The processor 11A that starts step S21 specifies the content of the preprocessing that is already executed on the specified target data (step S111).

Next, the processor 11A estimates a cause of decrease in certainty degree (step S211). For example, the processor 11A estimates the cause by referring to a history of the content of the already executed preprocessing acquired in step S111.

Original image data which is the processing target is stored in the image processing apparatus 10. Accordingly, the processor 11A reads information about whether or not the ground tint is present, whether or not the background is present, the size of a font, whether or not the stain is present, whether or not a crease is present, a relationship in color between the background and the text, the type of original document, and the like from the image data and uses the information in estimation of the cause.

Besides, the certainty degree of the entire image data may be referred to in estimation of the cause. The certainty degree of the entire image data may be calculated in the image processing apparatus 10.

For example, the certainty degree of the entire image data may be calculated based on the ratio of the area of each partial region transmitted as the target data in step S3 in the original document and the magnitude of the certainty degree of each partial region. For example, the sum of a value obtained by multiplying "1" as a weight by the area of the partial region in which the certainty degree higher than the threshold value is obtained, and a value obtained by multiplying "0" as a weight by the area of the partial region in which the certainty degree lower than the threshold value is obtained is calculated. Then, the calculated value is normalized by dividing the calculated value by the total sum of the areas of the partial regions set as the target of the OCR processing, and the certainty degree is calculated by comparing the normalized value with the threshold value. For example, in a case where the normalized value is higher than the threshold value, a determination that the certainty degree of the entire image data is high is made. In a case where the normalized value is lower than the threshold value, a determination that the certainty degree of the entire image data is low is made.

A partial region in which changing of the content of the preprocessing is not requested is regarded as having a high certainty degree. A partial region in which changing of the content of the preprocessing is requested is regarded as having a low certainty degree.

For example, in a case where the certainty degree of the entire image data is high and only the certainty degree of a specific partial region is low, a cause specific to the specific partial region is considered. Meanwhile, in a case where the certainty degree of not only the specific partial region but also the entire image data is low, a common cause regardless of a difference between types of objects is estimated. For example, a possibility that the stain or the crease is the cause is estimated.

In a case where a history of the content of the preprocessing used for partial regions of the same or similar types and information related to the certainty degree is present, the cause may be estimated based on the content of the preprocessing when a high certainty degree is obtained. The partial regions of the same or similar types mean that the content of the image data corresponding to the partial regions is of the same or similar types. In this case, the cause does not need to be estimated, and the content of the preprocessing when a high certainty degree is obtained may be provided to step S212.

In estimation in step S211, a table of correspondence relationship prepared in advance, the learned model updated by machine learning, and a determination program are used.

The table of correspondence relationship stores combinations of features extracted from the entire image data and features of the partial regions and the cause considered in a case where the certainty degree is low. The content of the preprocessing recommended for each combination may be stored.

In the case of using the learned model, the cause is output in a case where the image data corresponding to the partial regions is input into the learned model. In a case where the image data corresponding to the partial regions is input into the learned model, the content of the recommended preprocessing may be output.

In the case of using the determination program, the cause considered to decrease the certainty degree is output by performing branching based on individual determinations once or repeating the branching a plurality of times. Even in this case, the content of the recommended preprocessing may be output instead of the cause.

In a case where the cause is estimated in step S211, the processor 11A executes the preprocessing with a content of eliminating the estimated cause on the target data (step S212). For example, a relationship between the estimated cause and the content of the preprocessing effective for eliminating the cause is stored in the storage apparatus 12. As described above, in a case where the content of the preprocessing of eliminating the cause of decrease in certainty degree is specified by skipping estimation of the cause, the specified content of the preprocessing is executed.

Next, the processor 11A learns the relationship between the partial regions and the content of the preprocessing using the content of the preprocessing immediately previously executed on the target data and information related to the certainty degree (step S213).

In the case of this exemplary embodiment, the information related to the certainty degree is not directly notified from the OCR processing server 20. Thus, the processor 11A determines the information related to the certainty degree for each partial region. As described above, the certainty degree of the partial region in which changing of the content of the preprocessing is not requested is determined as being high, and the certainty degree of the partial region in which changing of the content of the preprocessing is requested is determined as being low.

After step S213, the processor 11A determines whether or not processing is finished for all notified target data (step S115).

In a case where a negative result is obtained in step S115, the processor 11A returns to step S111 and repeats a series of processing on the target data corresponding to another partial region.

In a case where a positive result is obtained in step S115, the processor 11A returns to step S3.

The above processing is repeated until a negative result is obtained in step S4. Consequently, the text data having a certainty degree higher than the threshold value is provided to the postprocessing executed by the image processing apparatus 10, and improvement in the accuracy or the reliability of the result of the postprocessing is implemented. In addition, reduction of an effort to manually check or manually correct the recognized text data is implemented.

While the preprocessing with a content of eliminating the cause of decrease in certainty degree is executed on the target data in the flowchart illustrated in FIG. 10, one type of preprocessing with a content not executed on the identical partial region in the identical image data may be selected and executed without estimating the cause.

In this case, the cause of decrease in certainty degree is not necessary eliminated, but elimination of a decrease in certainty degree is expected while changing of the content of the preprocessing is repeated. Even in a case where the number of repetitions of processing is increased compared to the processing illustrated in FIG. 10, a load on calculation resources is decreased as processing such as estimation is not needed.

Exemplary Embodiment 3

Figure 11:
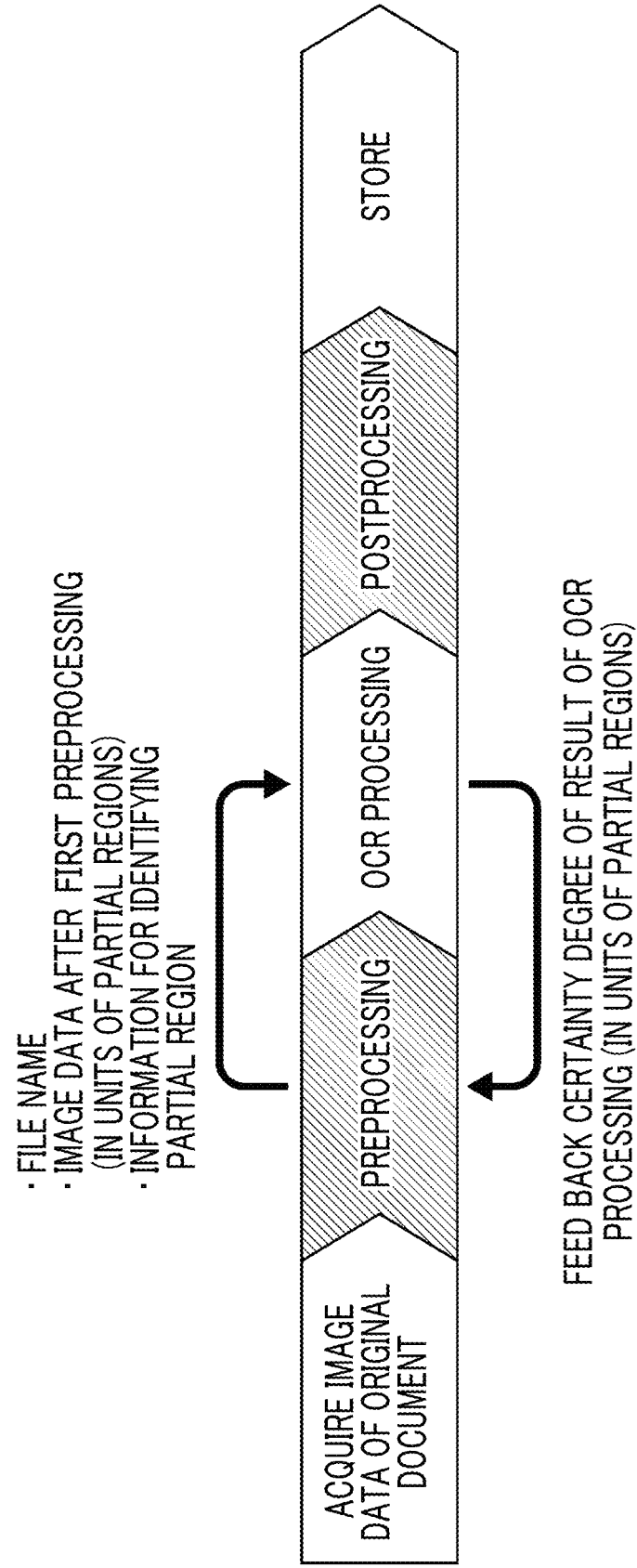
FIG. 11 is a diagram for describing a summary of processing executed in Exemplary Embodiment 3.

FIG. 11 is a diagram for describing a summary of processing executed in Exemplary Embodiment 3. In FIG. 11, parts corresponding to FIG. 8 are designated by corresponding reference signs.

In the case of this exemplary embodiment, a part of information fed back to the preprocessing from the OCR processing is different from Exemplary Embodiment 1. Specifically, the certainty degree of the result of the OCR processing is fed back. Transmission of the certainty degree is executed in both of a case where the certainty degree is low and a case where the certainty degree is high.

Figure 12:
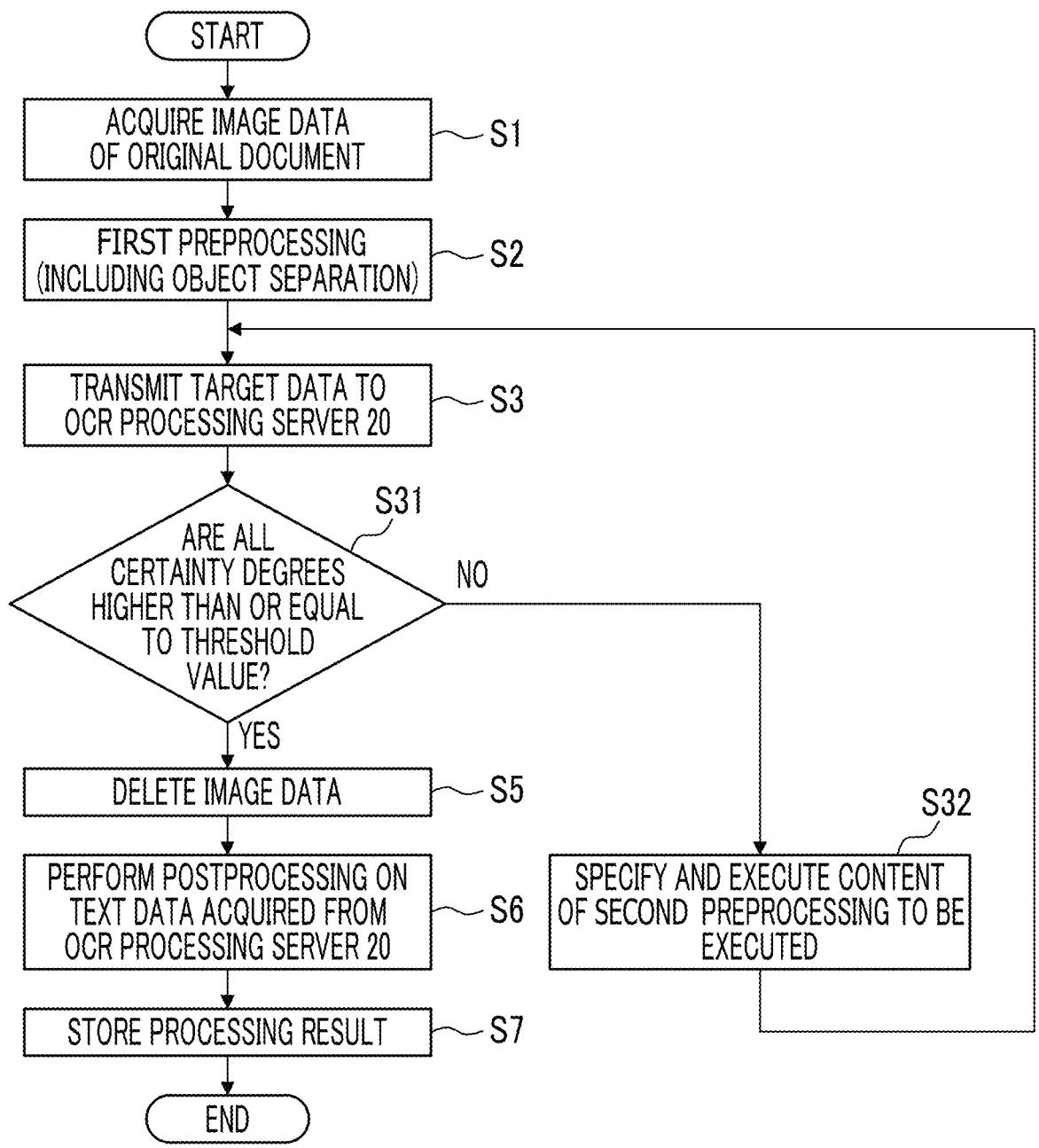
FIG. 12 is a flowchart for describing one example of processing executed by an image processing apparatus in Exemplary Embodiment 3.

FIG. 12 is a flowchart for describing one example of processing executed by the image processing apparatus 10 in Exemplary Embodiment 3. In FIG. 12, parts corresponding to FIG. 9 are designated by corresponding reference signs. Symbol S illustrated in the drawing denotes a step.

In the case of this exemplary embodiment, the certainty degree of the result of the OCR processing is fed back to the image processing apparatus 10 from the OCR processing server 20 every time.

Thus, the processor 11A determines whether or not all certainty degrees are higher than or equal to the threshold value after execution of step S3 (step S31). The threshold value here may be the same value regardless of a difference between objects or may be a different value for each object.

In a case where a positive result is obtained in step S31, the processor 11A transitions to step S5. The reason is that the preprocessing does not need to be re-executed in a case where a certainty degree higher than the threshold value is obtained for all target data transmitted to the OCR processing server 20.

In a case where a negative result is obtained in step S31, the processor 11A specifies and executes the content of the preprocessing to be executed (step S32).

Figure 13:
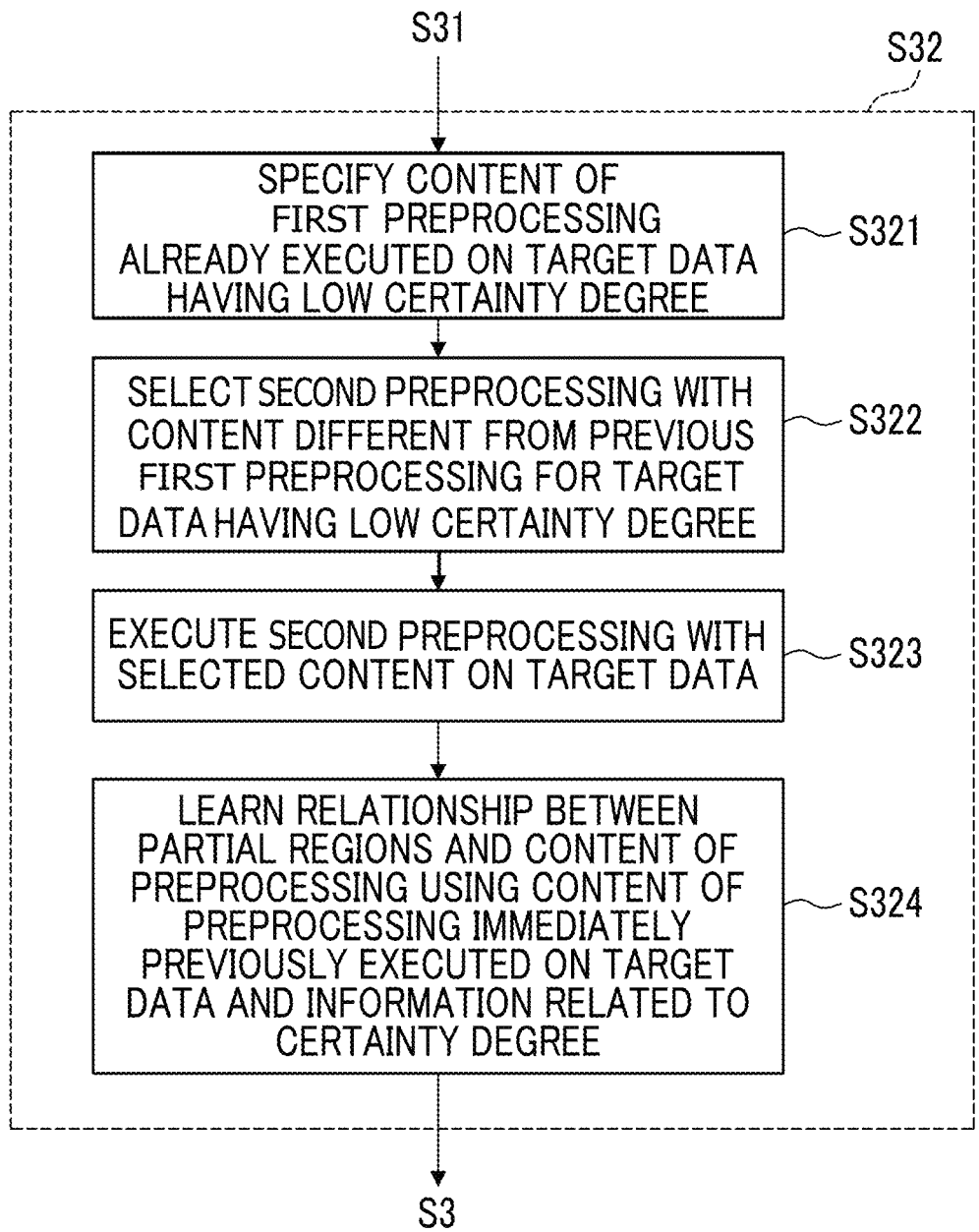
FIG. 13 is a flowchart for describing one example of processing executed in step S32 in Exemplary Embodiment 3.

FIG. 13 is a flowchart for describing one example of processing executed in step S32 in Exemplary Embodiment 3.

First, the processor 11A specifies the content of the preprocessing already executed on the target data having a low certainty degree (step S321).

Next, the processor 11A selects the preprocessing with a content different from previous preprocessing for the target data having a low certainty degree (step S322). Like the case of Exemplary Embodiment 2, the cause of decrease in certainty degree may be estimated, and the preprocessing with a content of eliminating the estimated cause may be selected. This example will be described later.

Next, the processor 11A executes the preprocessing with the selected content on the target data (step S323).

Next, the processor 11A learns the relationship between the partial regions and the content of the preprocessing using the content of the preprocessing immediately previously executed on the target data and information related to the certainty degree (step S324). In the case of this exemplary embodiment, the relationship between the partial regions and the content of the preprocessing is learned for not only a case where the certainty degree is low but also the target data for which the certainty degree is determined as being high. Learning may also be performed in only one of the cases.

In a case where processing is finished, the processor 11A returns to step S3. The above processing is repeated until a positive result is obtained in step S31.

Consequently, the text data having a certainty degree higher than the threshold value is provided to the postprocessing executed by the image processing apparatus 10, and improvement in the accuracy or the reliability of the result of the postprocessing is implemented. In addition, reduction of an effort to manually check or manually correct the recognized text data is implemented.

Figure 14:
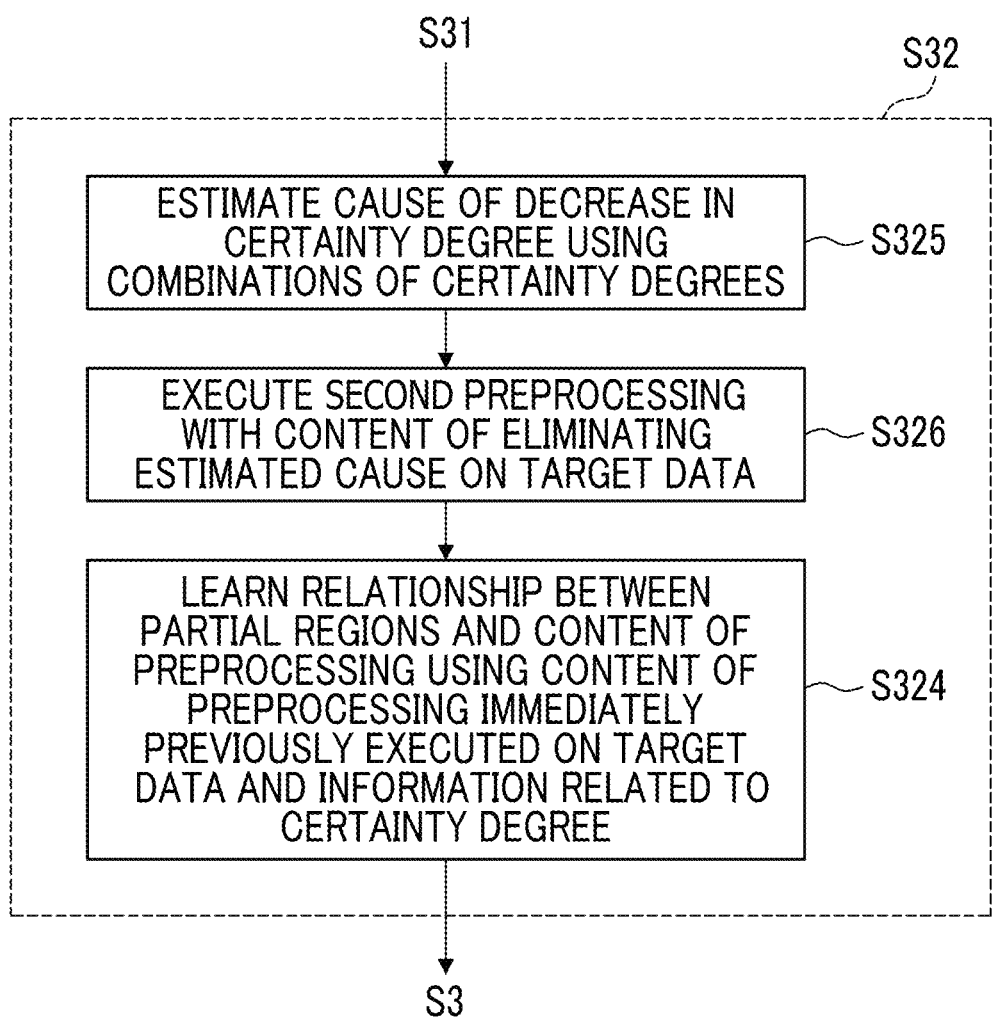
FIG. 14 is a flowchart for describing another example of processing executed in step S32 in Exemplary Embodiment 3.

FIG. 14 is a flowchart for describing another example of processing executed in step S32 in Exemplary Embodiment 3. In FIG. 14, parts corresponding to FIG. 13 are designated by corresponding reference signs.

In the processing illustrated in FIG. 14, combinations of a plurality of certainty degrees are used.

First, the processor 11A estimates the cause of decrease in certainty degree using the combinations of certainty degrees (step S325). The combinations of certainty degrees may be combinations of a plurality of certainty degrees acquired for a plurality of partial regions having a common type of object or may be combinations of certainty degrees in units of rows or columns constituting the partial regions. Alternatively, combinations of a plurality of certainty degrees combined in units of image data which is the processing target may be used.

FIG. 15 is a diagram for describing examples of causes estimated in a case where the target data is the table region. In FIG. 15, (A) illustrates a combination of certainty degrees fed back for one table region, and (B) illustrates the estimated causes. The example in FIG. 15 is an example of a case where the certainty degree is calculated and fed back for each row. In a case where the certainty degree is fed back in units of the entire table regions, detailed causes as illustrated in FIG. 15 may not be easily estimated.

In the example illustrated in FIG. 15, Table A or Table B in FIG. 5 is considered. Thus, the number of rows is three. In the case of FIG. 15, eight combinations of certainty degrees are present for one table region. These combinations are represented by Combinations 1 to 8 in FIG. 15. The number of combinations depends on the number of rows constituting the table region or the number of certainty degrees notified for one table region.

In a case where the background color of Table A or Table B varies between even-numbered rows and odd-numbered rows like the background color of each row corresponding to Combinations 1 to 8 in FIG. 15, the certainty degree may be calculated in units of odd-numbered rows and even-numbered rows even in a case where the number of rows is increased.

Combination 1 is a case where each certainty degree corresponding to the first row to the third row is higher than the threshold value. In this case, the content of the immediately previously executed preprocessing does not pose problems. Thus, estimation of the cause of a low certainty degree is not needed.

Combination 2 is a case where each certainty degree corresponding to the first row and the second row is higher than the threshold value and the certainty degree corresponding to the third row is lower than the threshold value. In this case, an estimation that cells of values have colored backgrounds is made as the cause of decrease in certainty degree.

Combination 3 is a case where each certainty degree corresponding to the first row and the third row is higher than the threshold value and the certainty degree corresponding to the second row is lower than the threshold value. Even in this case, an estimation that the cells of values have colored backgrounds is made as the cause of decrease in certainty degree.

Combination 4 is a case where the certainty degree corresponding to the first row is higher than the threshold value and each certainty degree corresponding to the second row and the third row is lower than the threshold value. In this case, an estimation that only the cells of values are shaded is made as the cause of decrease in certainty degree. Shading here includes the ground tint.

Combination 5 is a case where each certainty degree corresponding to the second row and the third row is higher than the threshold value and the certainty degree corresponding to the first row is lower than the threshold value. In this case, an estimation that cells of item names have white texts is made as the cause of decrease in certainty degree.

Combination 6 is a case where the certainty degree corresponding to the second row is higher than the threshold value and each certainty degree corresponding to the first row and the third row is lower than the threshold value. In this case, an estimation that the cells of item names have white texts and the cells of values have colored backgrounds is made as the cause of decrease in certainty degree.

Combination 7 is a case where the certainty degree corresponding to the third row is higher than the threshold value and each certainty degree corresponding to the first row and the second row is lower than the threshold value. Even in this case, an estimation that the cells of item names have white texts and the cells of values have colored backgrounds is made as the cause of decrease in certainty degree.

Combination 8 is a case where each certainty degree corresponding to the first row to the third row is lower than the threshold value. In this case, an estimation that the entire surface has the ground tint or the entire surface has a colored background, each text is a colored text, and the like is made as the cause of decrease in certainty degree.

The above estimation focuses on original features on the image of the original document. Thus, estimation of a decrease in certainty degree caused by an effect of the stain, the crease, or the like needs another information. For example, information about the certainty degree in units of original documents or the original image data is needed.

FIG. 14 will be described again.

In a case where the cause is estimated in step S325, the processor 11A executes the preprocessing with a content of eliminating the estimated cause on the target data (step S326).

Next, the processor 11A learns the relationship between the partial regions and the content of the preprocessing using the content of the preprocessing immediately previously executed on the target data and information related to the certainty degree (step S324). In the case of this exemplary embodiment, both of a relationship between the target data having a low certainty degree and the content of the executed preprocessing and a relationship between the target data having a high certainty degree and the content of the executed preprocessing are learned. Learning may also be performed in only one of the cases.

The content of processing after processing is finished is as described using FIG. 12.

Exemplary Embodiment 4

Figure 16:
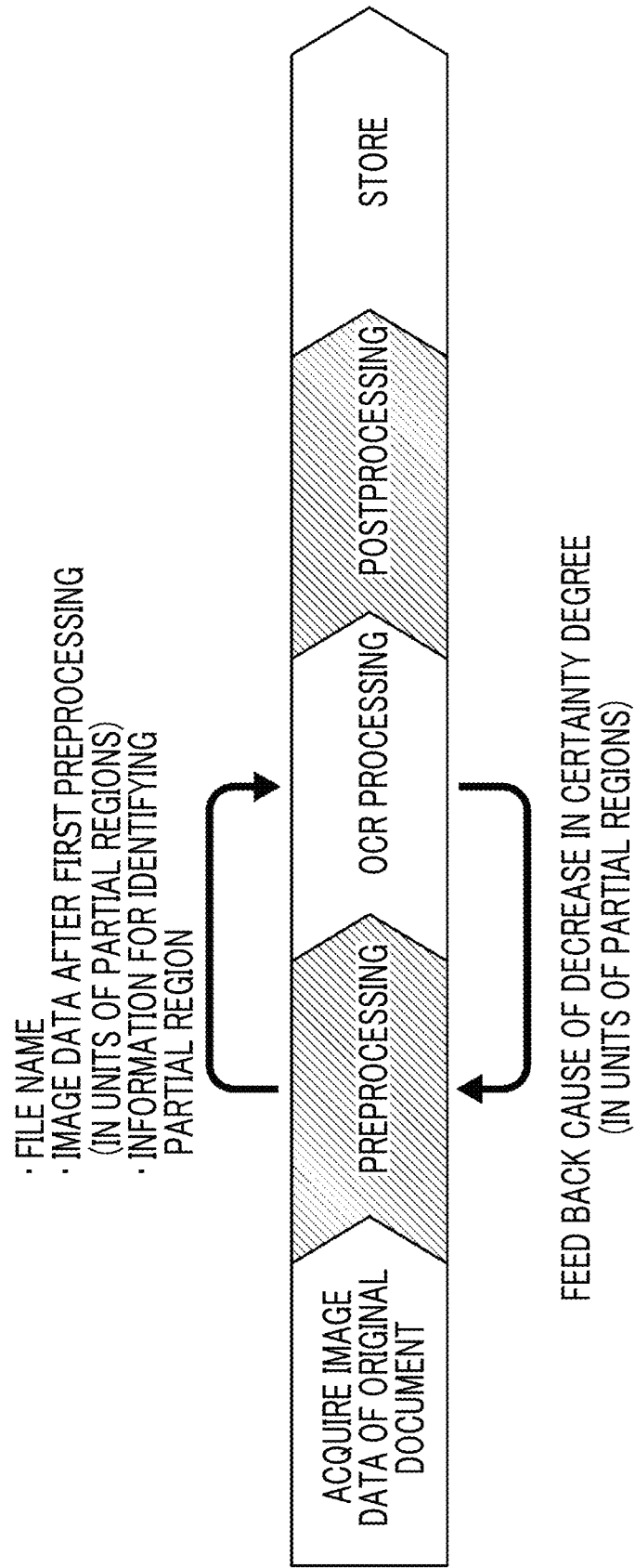
FIG. 16 is a diagram for describing a summary of processing executed in Exemplary Embodiment 4.

FIG. 16 is a diagram for describing a summary of processing executed in Exemplary Embodiment 4. In FIG. 16, parts corresponding to FIG. 11 are designated by corresponding reference signs.

In the case of this exemplary embodiment, the estimated cause is fed back to the preprocessing from the OCR processing instead of the certainty degree. In this case, estimation executed in Exemplary Embodiment 3 is executed on the OCR processing server 20 side.

Figure 17:
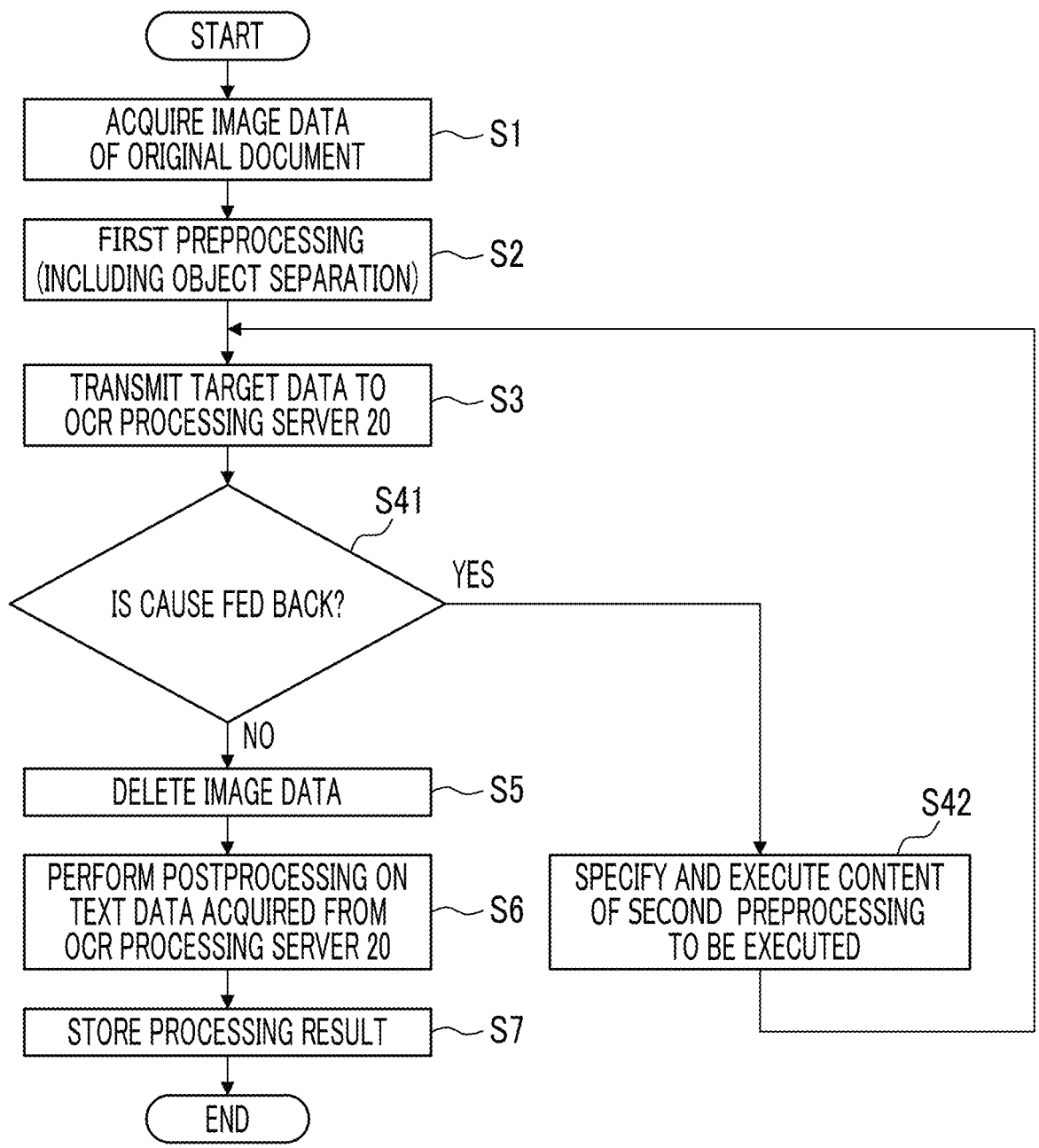
FIG. 17 is a flowchart for describing one example of processing executed by an image processing apparatus in Exemplary Embodiment 4.

FIG. 17 is a flowchart for describing one example of processing executed by the image processing apparatus 10 in Exemplary Embodiment 4. In FIG. 17, parts corresponding to FIG. 12 are designated by corresponding reference signs. Symbol S illustrated in the drawing denotes a step.

In the case of this exemplary embodiment, in a case where the processor 11A transmits the target data to the OCR processing server 20 (step S3), the processor 11A determines whether or not the cause is fed back (step S41).

Feedback of the cause is limited to a case where a partial region having a low certainty degree is present in the target data. Thus, in a case where a negative result is obtained in step S41, the processor 11A transitions to step S5 and executes the same processing as in the case of FIG. 12.

Meanwhile, in a case where a positive result is obtained in step S41, the processor 11A specifies and executes the content of the preprocessing to be executed (step S42).

Figure 18:
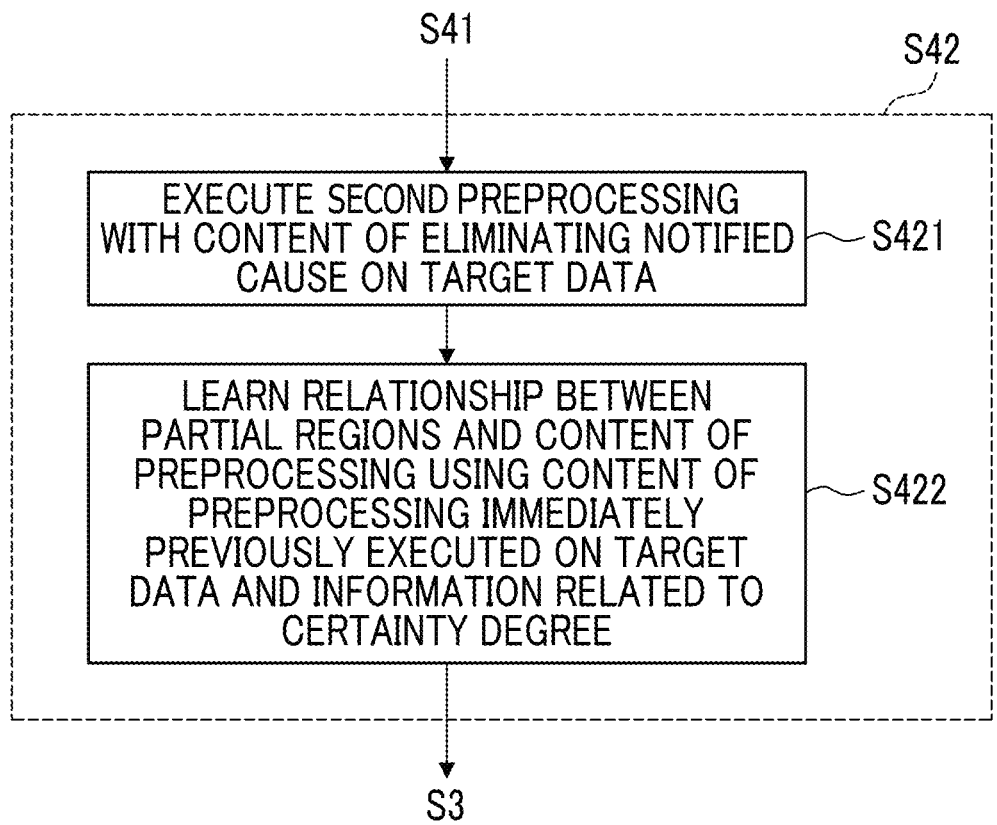
FIG. 18 is a flowchart for describing one example of processing executed in step S42 in Exemplary Embodiment 4.

FIG. 18 is a flowchart for describing one example of processing executed in step S42 in Exemplary Embodiment 4.

First, the processor 11A executes the preprocessing with a content of eliminating the notified cause on the target data (step S421).

FIG. 19 is a diagram for describing one example of notified causes.

Cause 1 to Cause 5 illustrated in FIG. 19 correspond to the causes illustrated in FIG. 15. Cause 1 indicates that the cells of values have colored backgrounds. Cause 2 indicates that the cells of values have colored backgrounds. Cause 3 indicates that the cells of item names have white texts. Cause 4 indicates that the cells of item names have white texts and the cells of values have colored backgrounds. Cause 5 indicates that the entire surface is the ground tint or the entire surface has a colored background, each text is a colored text, and the like. There is also a possibility that the stain, the crease, or the like is notified as the cause.

FIG. 18 will be described again.

In a case where the preprocessing corresponding to the cause is executed on the target data, the processor 11A learns the relationship between the partial regions and the content of the preprocessing using the content of the preprocessing immediately previously executed on the target data and information related to the certainty degree (step S422).

Performing notification of the cause means that the certainty degree of the corresponding partial region is lower than the threshold value. Conversely, not performing notification of the cause means that the certainty degree of the corresponding partial region is higher than the threshold value. Therefore, the processor 11A specifies the magnitude of the certainty degree based on whether or not the cause is notified.

The content of processing after processing is finished is as described using FIG. 12.

Exemplary Embodiment 5

Figure 20:
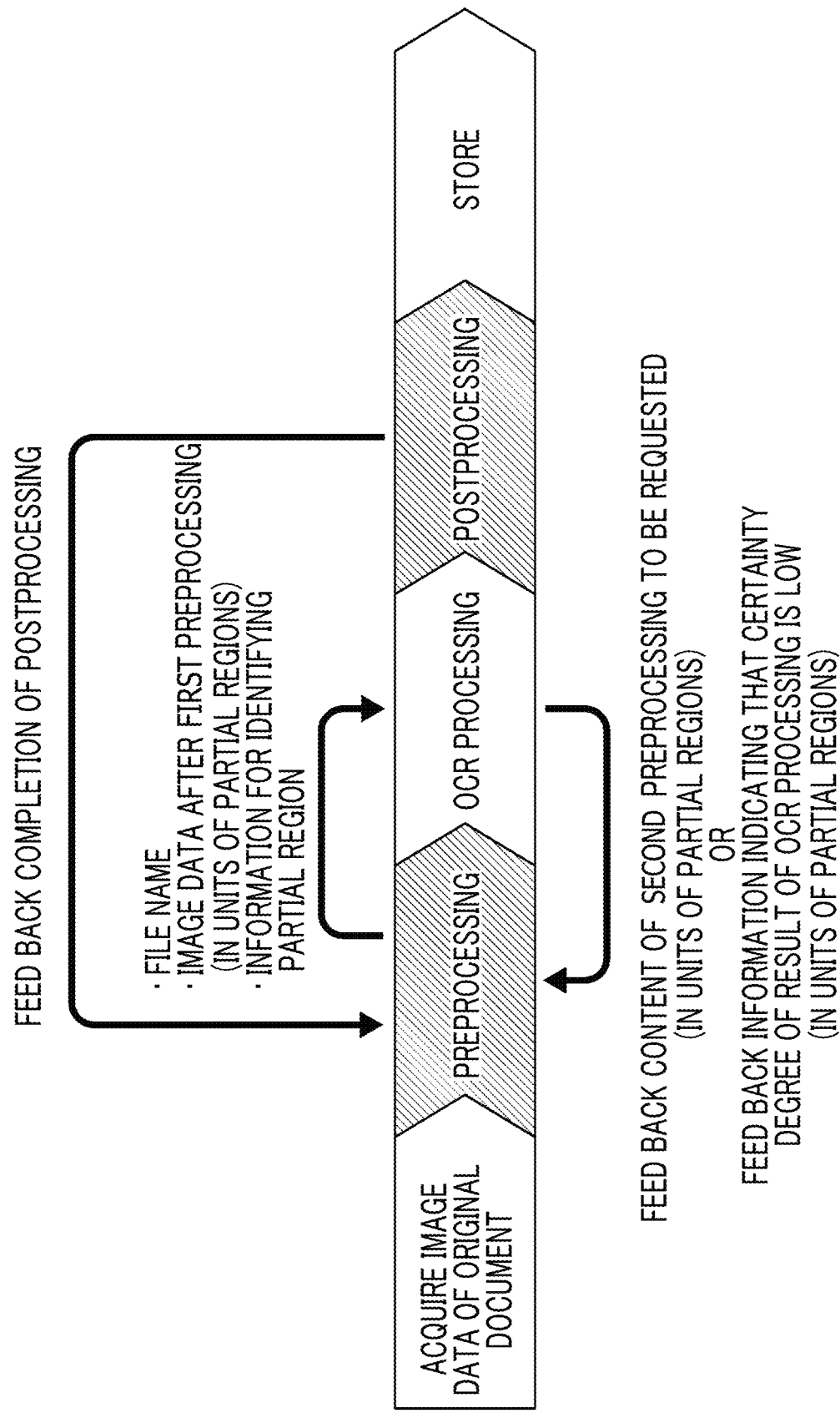
FIG. 20 is a diagram for describing a summary of processing executed in Exemplary Embodiment 5.

FIG. 20 is a diagram for describing a summary of processing executed in Exemplary Embodiment 5. In FIG. 20, parts corresponding to FIG. 3 are designated by corresponding reference signs.

The case of this exemplary embodiment is different from Exemplary Embodiment 1 in that feedback of completion of the postprocessing to the preprocessing from the postprocessing is added.

Figure 21:
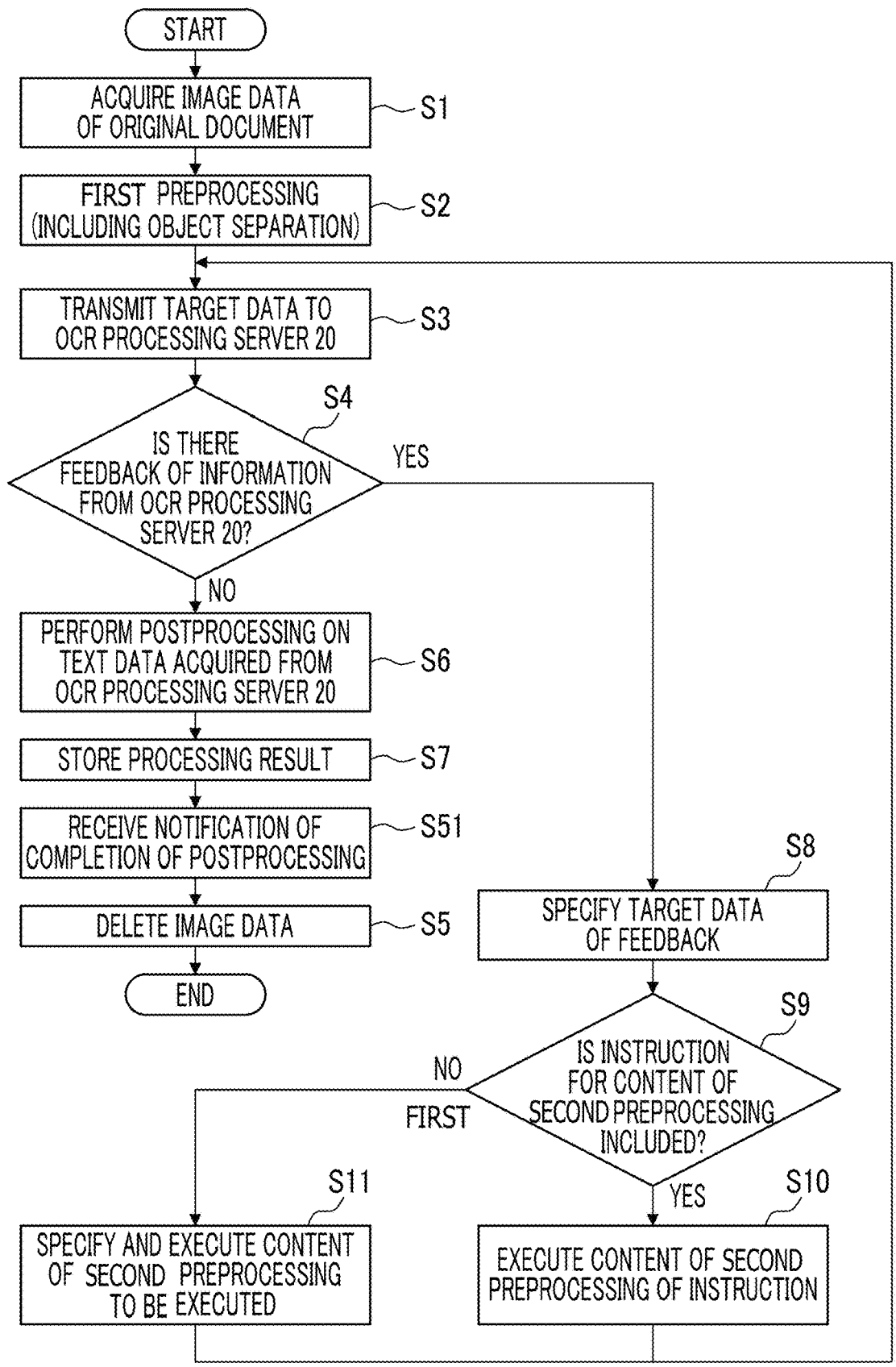
FIG. 21 is a flowchart for describing one example of processing executed by an image processing apparatus in Exemplary Embodiment 5.

FIG. 21 is a flowchart for describing one example of processing executed by the image processing apparatus 10 in Exemplary Embodiment 5. In FIG. 21, parts corresponding to FIG. 4 are designated by corresponding reference signs.

In the case of this exemplary embodiment, in a case where a negative result is obtained in step S4, the processor 11A sequentially executes steps S6 and S7 instead of step S5. That is, in a case where a negative result is obtained in step S4, the processor 11A executes the postprocessing based on the text data acquired from the OCR processing server 20 and stores a processing result in the storage apparatus 12.

In this exemplary embodiment, notification of completion of the postprocessing is received after execution of step S7 (step S51). After reception of the notification, the processor 11A deletes the image data (step S5). Since the image data is deleted after the notification of completion of the postprocessing is checked, the image data is not requested after deletion of the image data.

While feedback of completion of the postprocessing is added to Exemplary Embodiment 1 in this exemplary embodiment, the feedback may also be added to any of Exemplary Embodiments 2 to 4.

Exemplary Embodiment 6

Figure 22:
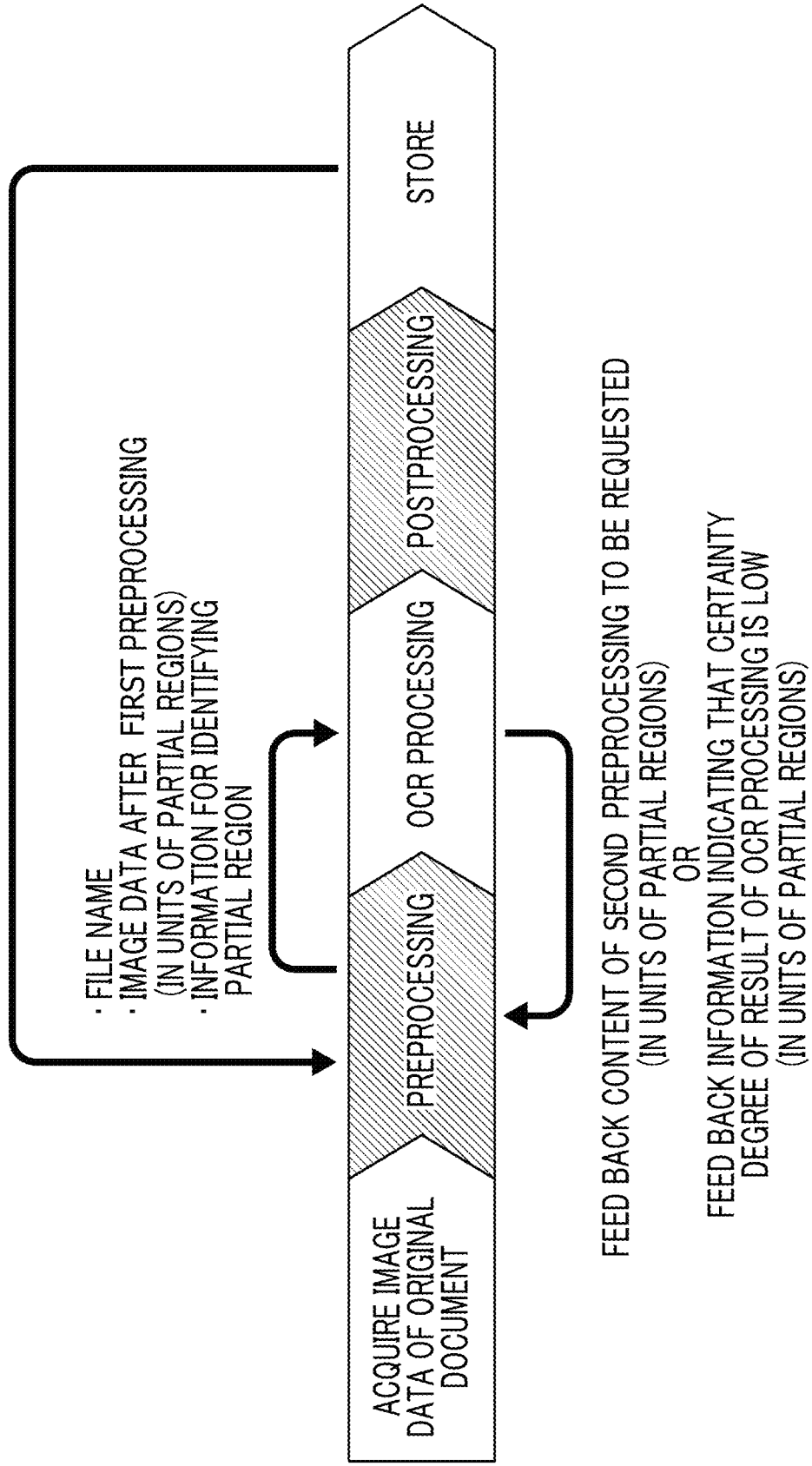
FIG. 22 is a diagram for describing a summary of processing executed in Exemplary Embodiment 6.

FIG. 22 is a diagram for describing a summary of processing executed in Exemplary Embodiment 6. In FIG. 22, parts corresponding to FIG. 3 are designated by corresponding reference signs.

The case of this exemplary embodiment is different from Exemplary Embodiment 1 in that a function of feeding back completion of storage to the preprocessing is added.

Figure 23:
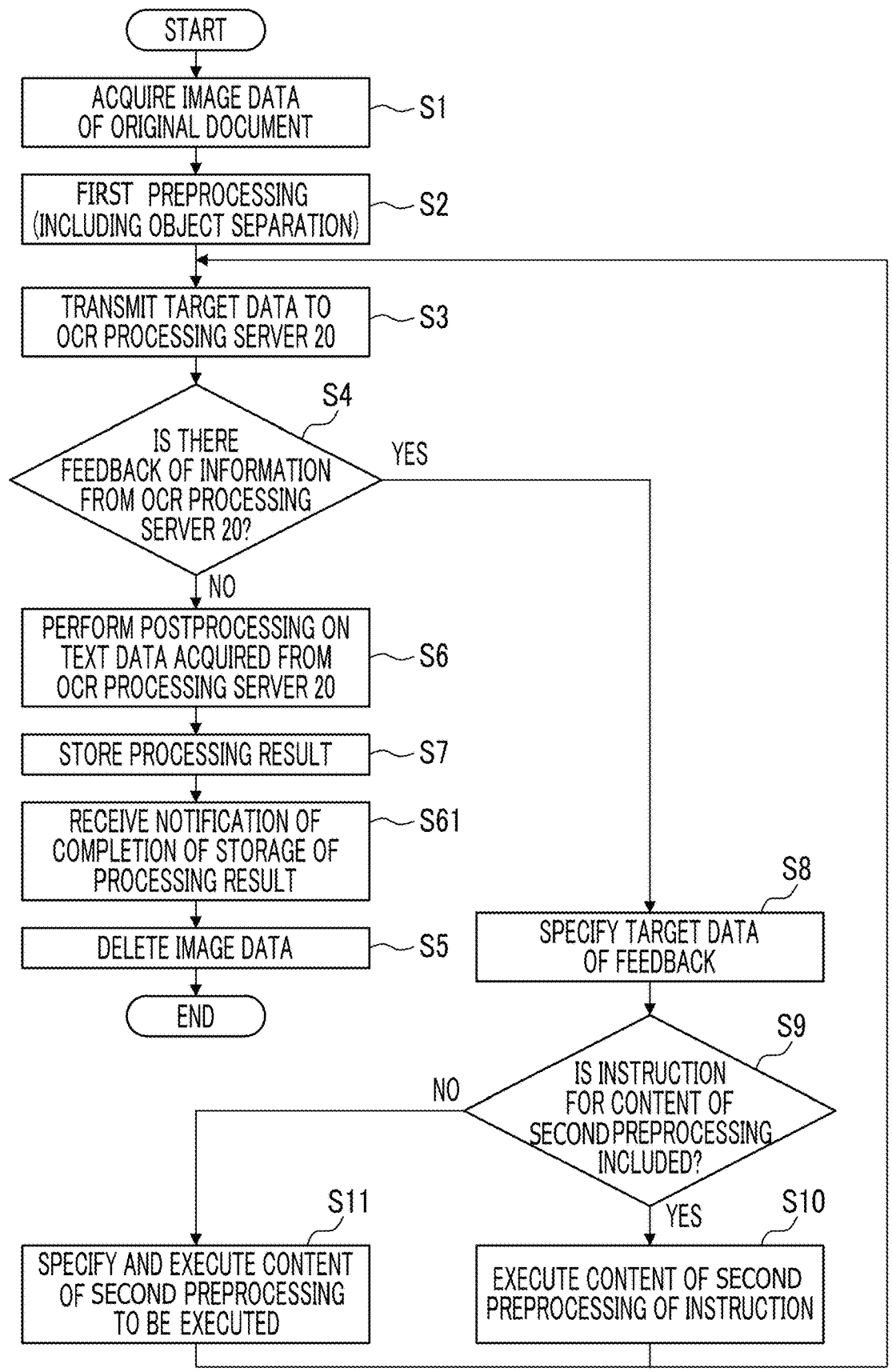
FIG. 23 is a flowchart for describing one example of processing executed by an image processing apparatus in Exemplary Embodiment 6.

FIG. 23 is a flowchart for describing one example of processing executed by the image processing apparatus 10 in Exemplary Embodiment 6. In FIG. 23, parts corresponding to FIG. 4 are designated by corresponding reference signs.

In the case of this exemplary embodiment, in a case where a negative result is obtained in step S4, the processor 11A sequentially executes steps S6 and S7 instead of step S5. That is, in a case where a negative result is obtained in step S4, the processor 11A executes the postprocessing based on the text data acquired from the OCR processing server 20 and stores a processing result in the storage apparatus 12.

In this exemplary embodiment, notification of completion of storage of the processing result is received after execution of step S7 (step S61). After reception of the notification, the processor 11A deletes the image data (step S5). Since the image data is deleted after storage of the processing result, the image data is not requested after deletion of the image data.

While feedback of completion of storage of the processing result is added to Exemplary Embodiment 1 in this exemplary embodiment, the feedback may also be added to any of Exemplary Embodiments 2 to 4.

Exemplary Embodiment 7

Figure 24:
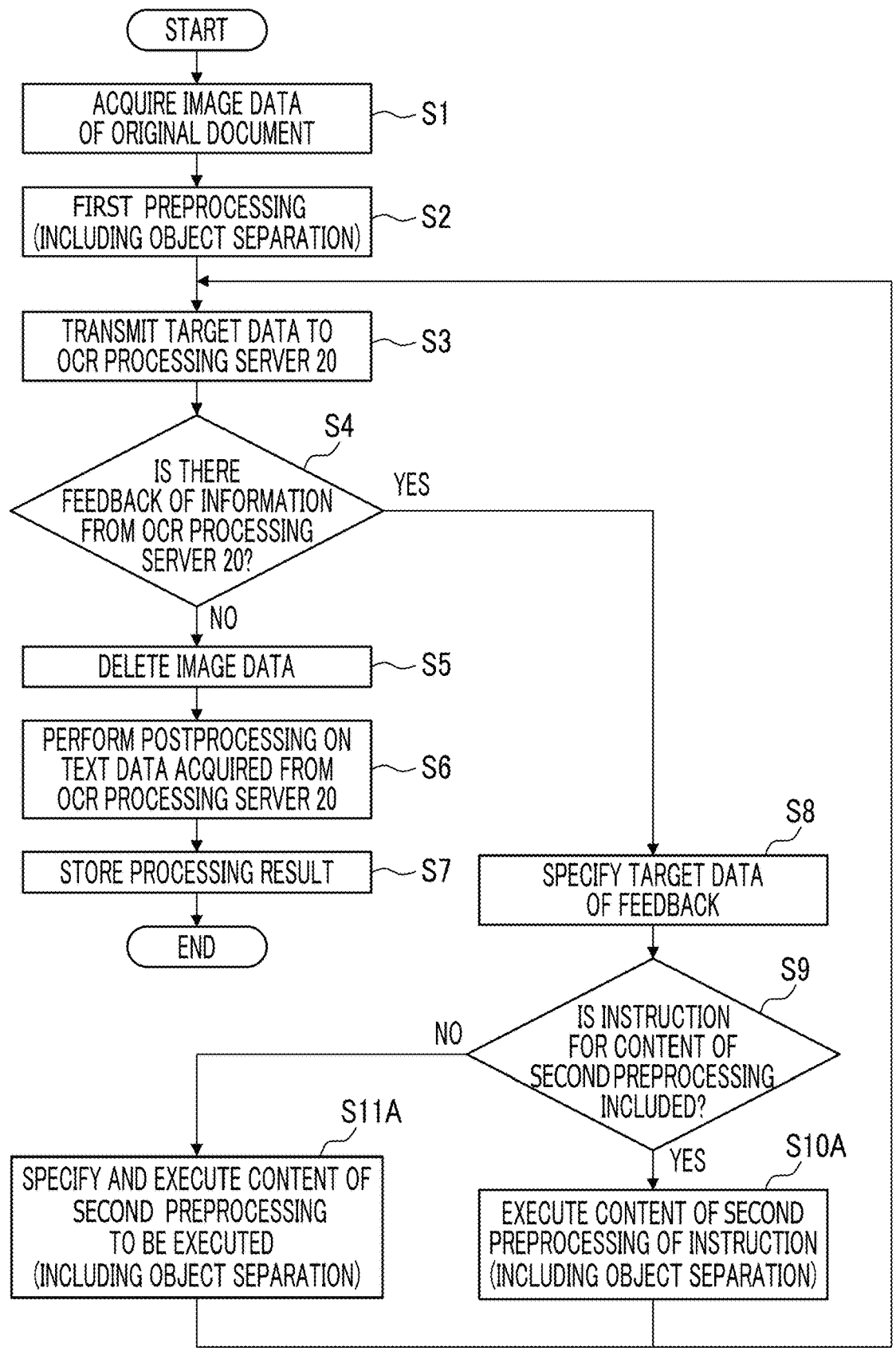
FIG. 24 is a flowchart for describing one example of processing executed by an image processing apparatus in Exemplary Embodiment 7.

FIG. 24 is a flowchart for describing one example of processing executed by the image processing apparatus 10 in Exemplary Embodiment 7. In FIG. 24, parts corresponding to FIG. 4 are designated by corresponding reference signs.

In the case of the flowchart illustrated in FIG. 4, a case where only the content of the preprocessing is re-executed in step S10 or step S11 is described.

However, as illustrated in FIG. 24, when the preprocessing is executed again, re-execution may be performed from separation of the objects. In FIG. 24, steps S10 and S11 including re-execution of separation of the objects are illustrated as steps S10A and S11A.

Separation of the objects may also be re-executed in the case of executing the preprocessing again in the other exemplary embodiments described above.

Exemplary Embodiment 8

Figure 25:
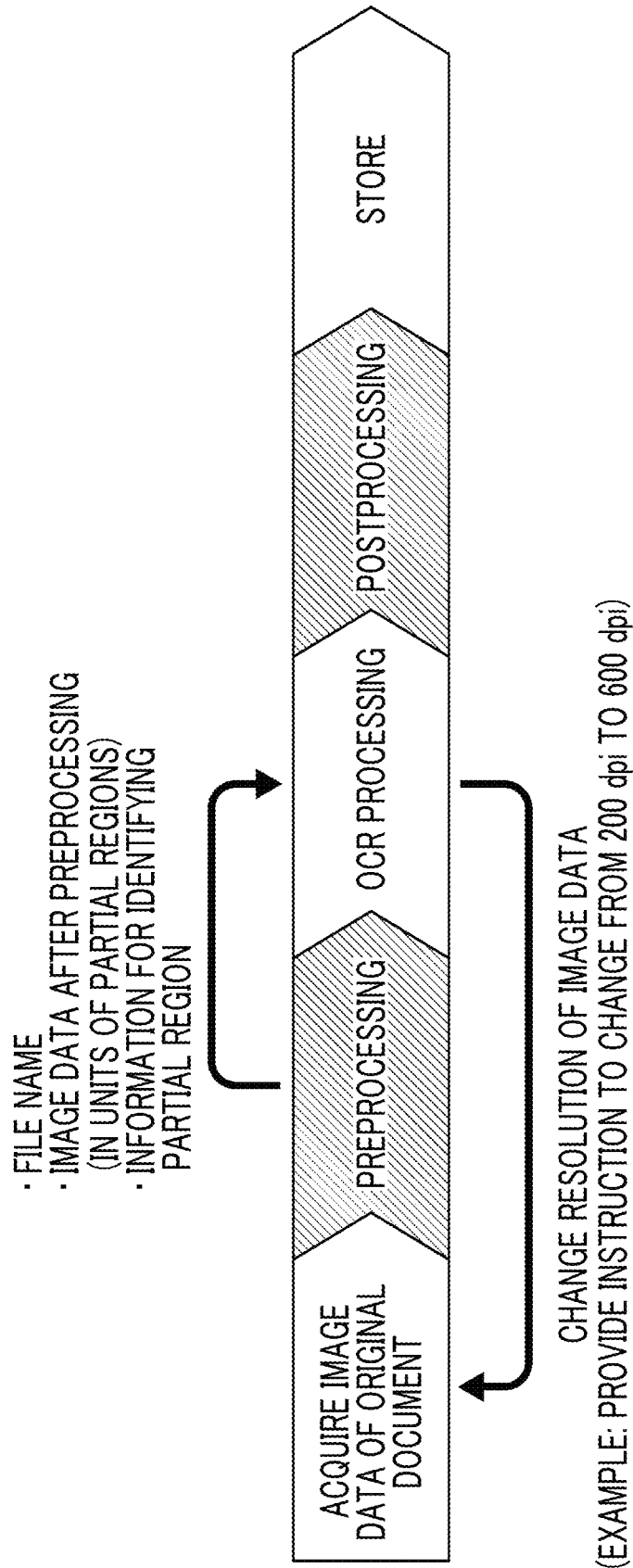
FIG. 25 is a diagram for describing a summary of processing executed in Exemplary Embodiment 8.

FIG. 25 is a diagram for describing a summary of processing executed in Exemplary Embodiment 8. In FIG. 25, parts corresponding to FIG. 3 are designated by corresponding reference signs.

While the OCR processing executes feedback to the preprocessing in the case of the above exemplary embodiments, the OCR processing executes feedback to processing of acquiring the image data of the original document in the case of this exemplary embodiment.

For example, in a case where resolution that is used at the time of acquiring the image data is low with respect to the size of the text printed or written on the original document, there is a possibility that the certainty degree of the result of the OCR processing is decreased. In a case where non-matching of the resolution is the cause of decrease in certainty degree, the certainty degree is not improved even in a case where the content of the preprocessing is changed.

Therefore, in this exemplary embodiment, in a case where the size of the font included in the image data which is the target of the OCR processing is the cause of a low certainty degree, changing of the resolution of the image data is fed back to the processing of acquiring the image data of the original document. In the example in FIG. 25, an instruction to change from 200 dpi to 600 dpi is provided. A technology for detecting the magnitude of the font size is known.

The feedback described in this exemplary embodiment may be combined with any of the above exemplary embodiments.

Other Exemplary Embodiments

While the exemplary embodiments of the present invention are described above, the technical scope of the present invention is not limited to the scope disclosed in the above exemplary embodiments. Inclusion of the above exemplary embodiments subjected to various changes or improvements in the technical scope of the present invention is apparent from the disclosure of the claims.

(1) For example, while the OCR processing is considered as one example of the processing on the rear stage side on which the image data after the preprocessing is processed in the above exemplary embodiments, the processing on the rear stage side is not limited to the OCR processing. For example, the postprocessing described in Exemplary Embodiment 7 or the processing of storage described in Exemplary Embodiment 8 is also included in the processing on the rear stage side.

A combination of the preprocessing and the processing on the rear stage side is not limited to a combination of the cleansing processing and the OCR processing. For example, the preprocessing may be extraction of a feature amount for face recognition, and the processing on the rear stage side may be face recognition using the extracted feature amount. In this case, the certainty degree is information or the like representing the accuracy of the result of face recognition.

Accordingly, while the content of the preprocessing is described assuming execution of the OCR processing in the above exemplary embodiments, any combination of the preprocessing and the processing on the rear stage side may be used.

(2) While the certainty degree is calculated in units of rows constituting the table assuming the original document illustrated in FIG. 5 in the case of the above exemplary embodiments, the above exemplary embodiments may also be applied to the case of calculating the certainty degree in units of columns.

(3) While the image processing apparatus 10 having a function of generating the image data by optically reading the original document and other functions is illustrated as one example of the apparatus applying the preprocessing to the image data provided to the OCR processing server 20 in the above exemplary embodiments, an image scanner specialized in acquiring the image data corresponding to the original document may be used as the image processing apparatus 10. The auto document feeder (ADF) may be disposed in the image scanner.

In addition, not only the smartphone or the digital camera used in imaging of the original document but also a computer externally acquiring the image data obtained by imaging the original document may be used in the apparatus applying the preprocessing to the image data provided to the OCR processing server 20. The computer here is used in the preprocessing, the postprocessing of the data after the OCR processing, and the like and may not have a function of capturing the image of the original document or a function of optically reading information about the original document.

(4) While a case where the image processing apparatus and the OCR processing server 20 are configured as independent apparatuses is described in the above exemplary embodiments, the function of the OCR processing may be incorporated in the image processing apparatus 10. In this case, all of the preprocessing, the OCR processing, and the postprocessing are executed inside the image processing apparatus 10.

(5) While a case where processing of separating the region of the image corresponding to the image data for each object is executed in the image processing apparatus 10 is described in the above exemplary embodiments, the processing may be executed by the OCR processing server 20.

(6) While a case where the postprocessing of processing the text data obtained by the OCR processing is passed to the image processing apparatus 10 executing the preprocessing is described in the above exemplary embodiments, the text data obtained by the OCR processing may be output to a processing apparatus different from the image processing apparatus 10 executing the preprocessing.

(7) In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
execute first preprocessing on acquired image data; and
execute second preprocessing on a specified partial region of the image data as a target in a case where information for specifying at least one partial region in an image corresponding to the image data is received from post processing on which the image data after the first preprocessing is processed,
wherein the processor is configured to execute the second preprocessing with a content different from previous first preprocessing on the partial region specified by the information for specifying the partial region,
wherein the processor is configured to execute the second preprocessing different from the previous first preprocessing on a corresponding partial region in a case where information indicating that accuracy of a result of processing of which a target is the partial region is lower than a predetermined threshold value is included in the information for specifying the partial region.

2. The information processing apparatus according to claim 1,
wherein the information for specifying the partial region includes information related to accuracy of a result of processing the image data corresponding to the partial region.

3. The information processing apparatus according to claim 2,
wherein the information related to the accuracy is provided for each partial regions.

4. The information processing apparatus according to claim 2,
wherein the information related to the accuracy indicates that the accuracy of the result of processing is lower than a predetermined threshold value.

5. The information processing apparatus according to claim 1,
wherein the information for specifying the partial region includes information related to a cause of low accuracy of a result of processing.

6. The information processing apparatus according to claim 5, wherein the information related to the cause is information related to a text or a background included in the partial region.

7. The information processing apparatus according to claim 1,
wherein the information for specifying the partial region includes information for providing an instruction of a content of the second preprocessing.

8. The information processing apparatus according to claim 7,
wherein the information for providing the instruction of the content of the second preprocessing includes information for providing an instruction of a value of a parameter used in the second preprocessing.

9. The information processing apparatus according to claim 1,
wherein the processor is configured to estimate a cause based on the information indicating that the accuracy of the result of processing is lower than the predetermined threshold value.

10. The information processing apparatus according to claim 9,
wherein the processor is configured to estimate the cause by including accuracy of a result of processing in a rear stage side of which a target is the entire image data.

11. The information processing apparatus according to claim 1,
wherein the processor is configured to estimate the cause based on information obtained during the first preprocessing.

12. The information processing apparatus according to claim 1,
wherein the processor is configured to estimate the cause based on a history of the first preprocessing with respect to another image data similar to the image data.

13. The information processing apparatus according to claim 1,
wherein the processor is configured to estimate the cause based on a difference in accuracy between partial regions of the same type.

14. The information processing apparatus according to claim 1,
wherein the processor is configured to notify processing in a rear stage side of the information for specifying the partial region on which the second preprocessing is executed.

15. The information processing apparatus according to claim 1,
wherein the processor is configured to share information for identifying the image data after the first preprocessing with processing in a rear stage side.

16. The information processing apparatus according to claim 1,
wherein the processor is configured to, in a case where information related to a cause of low accuracy of the partial region is included in the information for specifying the partial region, execute the first preprocessing corresponding to the cause.

17. The information processing apparatus according to claim 1,
wherein the processor is configured to, in a case where information for providing an instruction of a content of the first preprocessing is included in the information for specifying the partial region, execute the first preprocessing with the content of the instruction.

18. A non-transitory computer readable medium storing a program causing a computer to implement:
a function of executing first preprocessing on acquired image data; and
a function of executing second preprocessing on a specified partial region of the image data as a target in a case where information for specifying at least one partial region in an image corresponding to the image data is received from post processing in which the image data after the first preprocessing is processed,
wherein the function of executing the second preprocessing with a content different from previous first preprocessing on the partial region specified by the information for specifying the partial region,
wherein the function of executing the second preprocessing different from the previous first preprocessing on a corresponding partial region in a case where information indicating that accuracy of a result of processing of which a target is the partial region is lower than a predetermined threshold value is included in the information for specifying the partial region.

19. A non-transitory computer readable medium storing a program causing a computer to implement:
a function of executing first preprocessing on acquired image data; and
a function of executing second preprocessing on a specified partial region of the image data as a target in a case where information for specifying at least one partial region in an image corresponding to the image data is received from post processing in which the image data after the first preprocessing is processed,
wherein the function of executing the second preprocessing with a content different from previous first preprocessing on the partial region specified by the information for specifying the partial region,
wherein the processor is configured to, in a case where information related to a cause of low accuracy of the partial region is included in the information for specifying the partial region, execute the first preprocessing corresponding to the cause.

* * * * *